United States Patent
Wachter et al.

(10) Patent No.: US 9,860,695 B2
(45) Date of Patent: *Jan. 2, 2018

(54) LOCATION REPORTING WITH SECURE USER PLANE LOCATION (SUPL)

(71) Applicant: QUALCOMM Incorporated, San Diego, CA (US)

(72) Inventors: Andreas Wachter, Menlo Park, CA (US); Stephen William Edge, Escondido, CA (US); Kirk Allan Burroughs, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

This patent is subject to a terminal disclaimer.

(21) Appl. No.: 14/482,964

(22) Filed: Sep. 10, 2014

(65) Prior Publication Data

US 2015/0005006 A1 Jan. 1, 2015

Related U.S. Application Data

(63) Continuation of application No. 13/673,825, filed on Nov. 9, 2012, now Pat. No. 8,874,134, which is a (Continued)

(51) Int. Cl.
*H04W 4/02* (2009.01)
*H04W 8/16* (2009.01)
(Continued)

(52) U.S. Cl.
CPC ............ *H04W 4/021* (2013.01); *H04W 4/02* (2013.01); *H04W 4/023* (2013.01); *H04W 4/027* (2013.01);
(Continued)

(58) Field of Classification Search
CPC ..................................................... H04W 4/021
See application file for complete search history.

(56) References Cited

U.S. PATENT DOCUMENTS 6,313,787 B1 11/2001 King et al.
6,353,743 B1 3/2002 Karmel
(Continued)

FOREIGN PATENT DOCUMENTS

CN 1620178 A 5/2005
EP 1617686 A1 1/2006
(Continued)

OTHER PUBLICATIONS

Wachter et al. "SUPL 2.0 AD Area Event Triggered Services for NI Proxy." OMA-LOC-2006-0013R01-CR-SUPL-2_0-AD-Area-Event-Triggered-Services-for-N1-Proxy.doc, Feb. 2006. pp. 1-12.*
(Continued)

*Primary Examiner* — Gregory C. Issing
(74) *Attorney, Agent, or Firm* — Kilpatrick Townsend & Stockton, LLP

(57) ABSTRACT

Techniques for supporting periodic and other location services with Secure User Plane Location (SUPL) and other location architectures are described. The techniques can provide position estimates for a SUPL enabled terminal (SET) to a SUPL agent periodically and/or based on trigger events. A Home SUPL Location Platform (H-SLP) receives from the SUPL agent a request for position estimates for the SET. The H-SLP starts a SUPL location session with the SET. For each of at least one reporting event during the location session, the H-SLP obtains a position estimate for the SET and sends the position estimate to the SUPL agent. The position estimate may be derived by the SET and sent to the H-SLP. Alternatively, the position estimate may be derived by the H-SLP based on measurements from the SET.

35 Claims, 20 Drawing Sheets

Related U.S. Application Data continuation of application No. 13/269,084, filed on Oct. 7, 2011, now Pat. No. 8,755,818, which is a continuation of application No. 11/510,332, filed on Aug. 24, 2006, now Pat. No. 8,068,056.

(60) Provisional application No. 60/711,801, filed on Aug. 25, 2005, provisional application No. 60/718,112, filed on Sep. 16, 2005, provisional application No. 60/771,217, filed on Feb. 7, 2006, provisional application No. 60/771,706, filed on Feb. 8, 2006, provisional application No. 60/739,073, filed on Nov. 21, 2005, provisional application No. 60/788,544, filed on Mar. 30, 2006, provisional application No. 60/813,488, filed on Jun. 13, 2006, provisional application No. 60/771,180, filed on Feb. 6, 2006.

(51) Int. Cl.
| | | |
|---|---|---|
| *H04W 60/00* | (2009.01) | |
| *H04W 64/00* | (2009.01) | |
| *H04L 29/06* | (2006.01) | |
| *H04W 8/04* | (2009.01) | |
| *H04W 8/06* | (2009.01) | |
| *H04W 12/06* | (2009.01) | |
| *H04W 12/08* | (2009.01) | |

(52) U.S. Cl.
CPC ............ *H04W 4/028* (2013.01); *H04W 8/16* (2013.01); *H04W 60/00* (2013.01); *H04W 64/00* (2013.01); *H04W 64/006* (2013.01); *H04L 63/0869* (2013.01); *H04W 8/04* (2013.01); *H04W 8/06* (2013.01); *H04W 12/06* (2013.01); *H04W 12/08* (2013.01)

(56) References Cited

U.S. PATENT DOCUMENTS

| | | | |
|---|---|---|---|
| 6,369,751 B1 | 4/2002 | Naruse | |
| 6,453,237 B1 | 9/2002 | Fuchs et al. | |
| 6,718,177 B1 | 4/2004 | Comer et al. | |
| 6,788,253 B1 | 9/2004 | Calin | |
| 6,898,433 B1 | 5/2005 | Rajaniemi et al. | |
| 6,975,941 B1 | 12/2005 | Lau et al. | |
| 7,016,693 B2 | 3/2006 | Guyot | |
| 7,054,620 B2 | 5/2006 | Ewert et al. | |
| 7,218,940 B2 | 5/2007 | Niemenmaa et al. | |
| 7,277,711 B2 | 10/2007 | Nyu | |
| 7,421,277 B2 | 9/2008 | Burroughs et al. | |
| 7,424,293 B2 | 9/2008 | Zhu | |
| 7,536,695 B2 | 5/2009 | Alam et al. | |
| 7,558,585 B2 | 7/2009 | Laiho et al. | |
| 7,627,332 B2 | 12/2009 | Shim | |
| 7,706,813 B2* | 4/2010 | Shim ..................... | G01S 5/0205 340/988 |
| 7,778,639 B2* | 8/2010 | Shim ..................... | G01S 5/0054 455/418 |
| 7,869,815 B2 | 1/2011 | Ishii | |
| 7,869,817 B2 | 1/2011 | Shim | |
| 7,925,276 B2 | 4/2011 | Shim | |
| 7,974,639 B2 | 7/2011 | Burroughs et al. | |
| 8,068,056 B2 | 11/2011 | Wachter et al. | |
| 8,755,818 B2* | 6/2014 | Wachter .................. | H04W 4/02 455/456.1 |
| 8,792,902 B2 | 7/2014 | Edge et al. | |
| 2003/0225515 A1 | 12/2003 | Havlark et al. | |
| 2004/0003125 A1 | 1/2004 | Ichimura | |
| 2004/0137918 A1 | 7/2004 | Varonen et al. | |
| 2004/0192337 A1 | 9/2004 | Hines et al. | |
| 2004/0203914 A1 | 10/2004 | Kall et al. | |
| 2004/0253964 A1 | 12/2004 | Zhu | |
| 2004/0266453 A1 | 12/2004 | Maanoja et al. | |
| 2005/0020276 A1 | 1/2005 | Maanoja et al. | |
| 2005/0043038 A1 | 2/2005 | Maanoja et al. | |
| 2005/0075099 A1 | 4/2005 | Guyot | |
| 2005/0125493 A1 | 6/2005 | Chaskar et al. | |
| 2005/0136942 A1 | 6/2005 | Timiri et al. | |
| 2005/0181805 A1 | 8/2005 | Gallagher | |
| 2005/0239480 A1 | 10/2005 | Kim et al. | |
| 2005/0250516 A1* | 11/2005 | Shim ..................... | H04W 8/18 455/456.1 |
| 2006/0036680 A1 | 2/2006 | Shim | |
| 2006/0099958 A1 | 5/2006 | Gustafsson et al. | |
| 2006/0099960 A1 | 5/2006 | Duan | |
| 2006/0099961 A1 | 5/2006 | Duan | |
| 2006/0135174 A1 | 6/2006 | Kraufvelin et al. | |
| 2006/0223490 A1* | 10/2006 | Kim ........................ | H04L 67/18 455/403 |
| 2006/0258371 A1 | 11/2006 | Krishnamurthi et al. | |
| 2006/0274696 A1 | 12/2006 | Krishnamurthi | |
| 2006/0293066 A1 | 12/2006 | Edge et al. | |
| 2007/0026871 A1 | 2/2007 | Wager | |
| 2007/0054675 A1* | 3/2007 | Duan ..................... | H04W 4/02 455/456.2 |
| 2007/0054676 A1 | 3/2007 | Duan et al. | |
| 2007/0173253 A1 | 7/2007 | Duan et al. | |
| 2008/0139218 A1 | 6/2008 | Duan | |
| 2010/0173607 A1 | 7/2010 | Thornton et al. | |
| 2011/0319095 A1 | 12/2011 | Burroughs et al. | |
| 2013/0210451 A1 | 8/2013 | Edge et al. | |
| 2016/0029173 A1 | 1/2016 | Edge et al. | |

FOREIGN PATENT DOCUMENTS

| | | |
|---|---|---|
| EP | 1638350 A1 | 3/2006 |
| EP | 1686814 A1 | 8/2006 |
| JP | 2001346264 A | 12/2001 |
| JP | 2003235070 A | 8/2003 |
| JP | 2004061187 | 2/2004 |
| JP | 2004279409 A | 10/2004 |
| JP | 2006526338 | 11/2006 |
| JP | 2007511967 | 5/2007 |
| JP | 2007534180 | 11/2007 |
| KR | 20030015577 | 2/2003 |
| RU | 2002121494 | 3/2004 |
| WO | WO-9711384 | 3/1997 |
| WO | WO-03045101 A1 | 5/2003 |
| WO | WO-03061322 A1 | 7/2003 |
| WO | WO-2004112410 A1 | 12/2004 |
| WO | WO-2004114688 A1 | 12/2004 |
| WO | WO-2004114689 A1 | 12/2004 |
| WO | WO-2005051009 A1 | 6/2005 |
| WO | WO-2005069670 | 7/2005 |

OTHER PUBLICATIONS

Kim et al. "CR-Combined_Deferred_Location_Request." OMA-LOC-2004-0162R02-CR-Combined_Deferred_Location_Request. Jun. 2004. pp. 1-5.*

Xu et al."About Optimization Area Event Handing Proxy Mode." OMA-LOC-2006-0153R03-CR-Supl-2 0-TS. Jun. 2006. pp. 1-10.*

3GPP, "3rd Generation Partnership Project; Technical Specification Group GSM/EDGE Radio Access Network; Functional Stage 2 description of Location Services (LCS) in GERAN (Release 7)," 3GPP TS 43.059 v7.0.0, pp. 1-67 (Apr. 2005).

3GPP, "3rd Generation Partnership Project; Technical Specification Group Radio Access Network; Stage 2 functional specification of User Equipment (UE) positioning in UTRAN (Release 6)," 3GPP TS 25.305 v6.1.0, pp. 1-54 (Jun. 2004).

3GPP TS 23.032 V6.0.0 (Dec. 2004), 3rd Generation Partnership Project; Technical Specification Group Core Network; Universal Geographical Area Description (GAD) (Release 6).

3GPP TS 23.171 v3.11.0; "3rd Generation Partnership Project; Technical Specification Group Services and System Aspects; Functional stage 2 description of location services in UMTS," 3GPP TS 23.171 version 3.11.0 Release 1999 (Mar. 2004).

3GPP TS 23.271 v6.10.0; "3rd Generation Partnership Project; Technical Specification Group Services and System Aspects; Functional stage 2 description of Location Services (LCS)," 3GPP TS 23.271 version 6.10.0 Release 6 (Dec. 2004).

(56) References Cited

OTHER PUBLICATIONS

3GPP TS 23.271 v7.1.0; "3rd Generation Partnership Project; Technical Specification Group Services and System Aspects; Functional stage 2 description of Location Services (LCS)," 3GPP TS 23.271 version 7.1.0 Release 7 (Jun. 2005).
3GPP TS 24.080 v6.3.0; "3rd Generation Partnership Project; Technical Specification Group Core Network; Mobile radio interface layer 3 supplementary services specification; Formats and coding," 3GPP TS 24.080 version 6.3.0 Release 6 (Mar. 2005).
3GPP TS 25.453 v6.9.0; "3rd Generation Partnership Project; Technical Specification Group Radio Access Network; UTRAN Iupc interface Positioning Calculation Application Part (PCAP) signalling," 3GPP TS 25.453 version 6.9.0 Release 6 (Jun. 2005).
3GPP TS 43.059 V6.1.0 (Jun. 2003); 3rd Generation Partnership Project; Technical Specification Group GSM/EDGE Radio Access Network; Functional stage 2 description of Location Services (LCS) in GERAN (Release 6).
3GPP TSG-RAN WG3: "Addition of the U-TDOA location method to the UTRAN", Cingular Wireless, T-Mobile USA, Andrew Corporation, TruePosition, 3GPP TSG-RAN WG3 Meeting #47, R3-050764, May 13, 2005, pp. 1-37.
3GPP2 X.S0024 v1.0; "IP-Based Location Services," 3GPP2 X.S0024 version 1.0 Revision 0 (Oct. 2005).
3rd Generation Partnership Project 2 "3GPP2": "TIA/EIA-41-D Location Services Enhancements," 3GPP2 X.50002, Version 1.0.0, pp. 1-234 (Mar. 2004).
Anonymous: "Position Determination Service for cdma2000(R) Spread Spectrum Systems;(Revision of TIA/EIA/IS-801);TIA-801-A" 19000101, Apr. 2004 (Apr. 2004), XP017004816 p. 2.5-p. 2.6.
Defendant QUALCOMM Incorporated, Snaptrack, Inc. and Norman Krasner's Answer to Fourth Amended Complaint, Case 3:08-cv-01992-MMA-POR, Document 54, pp. 1-26. Jan. 21, 2010.
Duan, "A Disposal Method of Location Information Request in the Location Service", Wipo, Jan. 13, 2005, p. 1.
ETSI TS 123 271 v6.11.0; "Digital Cellular Telecommunications System (Phase 2+); Universal Mobile Telecommunications System (UMTS); Functional stage 2 description of Location Services (LCS)," XP014027546, 3GPP TS 23.271 version 6.11.0 Release 6 (Mar. 2005).
ETSI TS 125.305 v 6.1.0: "Universal Mobile Telecommunications Systems (UMTS)," European Telecommunications Standard Institute, France, (Jun. 1, 2004), XP014016761.
European Search Report—EP12164006—Search Authority—Munich—dated Apr. 23, 2014.
International Search Report—PCT/US2006/033250, International Searching Authority—European Patent Office—dated Dec. 19, 2006.
OMA, "Secure User Plane Location Architecture," Nov. 21, 2005, Open Mobile Alliance (OMA), Candidate Version 1.0, 80 pages.
OMA-AD-SUPL-V1_0-20050719-C; "Secure User Place Location Architecture," Open Mobile Alliance, Candidate Version 1.0, XP002410620, Jul. 19, 2005.
OMA-AD-SUPL-V2_0-20060619-D; "Secure User Plane Location Architecture," Open Mobile Alliance, Draft Version 4.0, Jun. 19, 2006.
OMA-TS-ULP-V1_0-20060704-C: "User Plane Location Protocol," Open Mobile Alliance, Candidate Version 1.0, Jan. 22, 2007.
OMA-TS-ULP-V2_0-20060727-D; "User Plane Location Protocol," Open Mobile Alliance, Draft Version 2.0, Jul. 27, 2006.
Open Mobile Alliance: "Secure User Plane Location Architecture," OMA-AD-SUPL-V1_0-20050719-C, Jul. 19, 2005, Candidate Version 1.0, pp. 1-80.
"Order Rescheduling Early Neutral Evaluation," United States District Court Civil Case No. 3:08-cv-01992-MMA-POR, Document 57, p. 1, Mar. 1, 2010.
"Plaintiffs' First Amended Complaint," United States District Court Case:3:08-cv-01992-MMA-POR, Document 14, pp. 1-39. Apr. 29, 2009.
"Plaintiffs' Fourth Amended Complaint", United States District Court Case 3:08-cv-01992-MMA-POR, Document 53, pp. 1-33, Jan. 11, 2010.
"Plaintiffs' Original Complaint," United States District Court Case:3:08-cv-01992-BEN-NLS, pp. 1-34, Oct. 24, 2008.
"Plaintiffs' Second Amended Complaint," United States District Court Case:3:08-cv-01992-MMA-POR, Document 36, pp. 1-40, Sep. 14, 2009.
"Plaintiffs' Third Amended Complaint," United States District Court Case:3:08-cv-01992-MMA-POR, Document 40, pp. 1-35, Oct. 9, 2009.
Qualcomm, "S2-051536: CR: 23.271: Addition of Periodic Location Procedures," 3GPP TSG-SA WG2 Meeting #47, Jul. 1, 2005, pp. 1-26, XP-002410621, Montreal, Canada.
QUALCOMM Incorporated: "S2-051535: Efficient Support of Periodic Location," 3GPP TSG SA WG2 S2#47, [Online] Jun. 27, 2005-Jul. 1, 2005, pp. 1-14, XP002405914, Montreal, Canada.
Secure User Plane Location Architecture, OMA, Draft Version 1 .0, Nov. 1, 2004, pp. 57.
Wang J., et al., "OMA-LOC-2004-136R03-CR_Supl_Ad_Message_Periodic Call Flows", Jun. 2004, URL, http://member.openmobilealliance.org/ftp/Public_documents/LOC/2004/OMA-LOC-2004-0136R03-SUPL_ Periodic_Call_Flows.zip.
Written Opinion—PCT/US2006/033250, International Searching Authority—European Patent Office—dated Dec. 19, 2006.

* cited by examiner

Retrieval of Historical Position Estimates for Non-Roaming in Proxy Mode

LOCATION REPORTING WITH SECURE USER PLANE LOCATION (SUPL)

This application is a continuation of U.S. application Ser. No. 13/673,825, entitled "LOCATION REPORTING WITH SECURE USER PLANE LOCATION (SUPL)," filed Nov. 9, 2012, which is a continuation of U.S. application Ser. No. 13/269,084, entitled "LOCATION REPORTING WITH SECURE USER PLANE LOCATION (SUPL)," filed Oct. 7, 2011, granted as U.S. Pat. No. 8,755,818, which is a continuation of U.S. application Ser. No. 11/510,332, entitled "LOCATION REPORTING WITH SECURE USER PLANE LOCATION (SUPL)," filed Aug. 24, 2006, granted as U.S. Pat. No. 8,068,056, which claims the benefit of Provisional U.S. Application Ser. No. 60/711,801, entitled "EFFICIENT PERIODIC LOCATION REPORTING IN A RADIO ACCESS NETWORK," filed Aug. 25, 2005, Provisional U.S. Application Ser. No. 60/718,112, entitled "EFFICIENT PERIODIC LOCATION REPORTING IN A RADIO ACCESS NETWORK," filed Sep. 16, 2005, Provisional U.S. Application Ser. No. 60/771,180, entitled "EFFICIENT PERIODIC LOCATION REPORTING IN A RADIO ACCESS NETWORK," filed Feb. 6, 2006, Provisional U.S. Application Ser. No. 60/771,217, entitled "CLARIFICATION AND CORRECTION OF PERIODIC LOCATION PROCEDURE," filed Feb. 7, 2006, Provisional U.S. Application Ser. No. 60/771,706, entitled "ADDITION OF PERIODIC LOCATION PROCEDURES," filed Feb. 8, 2006, Provisional U.S. Application Ser. No. 60/739,073, entitled "SUPL 2.0 TRIGGERED LOCATION PROXY MODE," filed Nov. 21, 2005, Provisional U.S. Application Ser. No. 60/788,544, entitled "TRIGGERED AND PERIODIC HISTORIC LOCATION REPORTING SYSTEM," filed Mar. 30, 2006, and Provisional U.S. Application Ser. No. 60/813,488, entitled "EFFICIENT LOCATION REPORTING IN A COMMUNICATION NETWORK," filed Jun. 13, 2006, all of which are assigned to the assignee hereof and incorporated herein by reference.

BACKGROUND

Field

The present disclosure relates generally to communication, and more specifically to techniques for providing location services.

Background

It is often desirable, and sometimes necessary, to know the location or position of a wireless device in a network. The terms "location" and "position" are synonymous and are used interchangeably herein. For example, a user may utilize the wireless device to browse through a website and may click on location sensitive content. A web server may then query the network for the position of the wireless device. The network may initiate position processing with the wireless device in order to ascertain the position of the wireless device. The network may then return a position estimate for the wireless device to the web server, which may use this position estimate to provide appropriate content to the user. There are many other scenarios in which knowledge of the position of the wireless device is useful or necessary.

A message flow (which may also be called a call flow or a procedure) is typically executed in order to obtain a position estimate for the wireless device and to send this position estimate to a client entity, e.g., the web server. Various messages are typically exchanged between one or more network entities, the wireless device, and the client entity for the message flow. These messages ensure that each entity is provided with pertinent information, or can obtain this information from another entity, in order to carry out positioning for the wireless device and/or to deliver the position estimate to the client entity. However, these messages add to the traffic among the various network entities. The additional traffic may be especially great for location services in which a position estimate for the wireless device is periodically provided to the client entity. The messages may also extend the response time for sending the position estimate to the client entity.

There is therefore a need in the art for techniques to efficiently provide location services.

SUMMARY

Techniques for supporting periodic and other location services with Secure User Plane Location (SUPL) and other location architectures are described herein. The techniques can provide position estimates for a SUPL enabled terminal (SET) to a SUPL agent periodically and/or based on trigger events or conditions.

In an embodiment, a Home SUPL Location Platform (H-SLP) receives from a SUPL agent a request for position estimates for a SET. The H-SLP starts a SUPL location session with the SET. For each of at least one reporting event during the location session, the H-SLP obtains a position estimate for the SET and sends the position estimate to the SUPL agent. The position estimate may be derived by the SET and sent to the H-SLP. Alternatively, the position estimate may be derived by the H-SLP based on measurements from the SET. Various details are described below.

Various aspects and embodiments of the disclosure are also described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, networks supporting a combination of the aforementioned technologies, networks with wide area network (WAN) coverage and/or wireless local area network (WLAN) coverage, and so on. A CDMA network may implement one or more radio technologies such as Wideband-CDMA (W-CDMA), cdma2000, and so on. cdma2000 covers IS-2000, IS-856, and IS-95 standards. A TDMA network may implement one or more radio technologies such as Global System for Mobile Communications (GSM), Digital Advanced Mobile Phone System (D-AMPS), and so on. D-AMPS covers IS-136 and IS-54. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

The techniques may also be used to help locate a device communicating using a wireline IP capable network such as a network providing DSL or cable access and/or may be used to support client devices communicating using a wireline network.

The techniques may also be used for various location architectures such as control plane and user plane architectures. A control plane (which is also called a signaling plane) is a mechanism for carrying signaling for higher-layer applications and is typically implemented with network-specific protocols and signaling messages. A user plane is a mechanism for carrying data for higher-layer applications and employing a user-plane bearer, which is typically implemented with protocols such as User Datagram Protocol (UDP), Transmission Control Protocol (TCP), and Internet Protocol (IP), all of which are known in the art. Messages supporting location services and positioning are carried as part of signaling in a control plane architecture and as part of data in a user plane architecture. The content of the messages may, however, be the same or similar in both architectures. The techniques may be used for SUPL and pre-SUPL architectures promulgated by Open Mobile Alliance (OMA), a 3GPP control plane architecture described in 3GPP TS 23.271, TS 43.059, and TS 25.305, a 3GPP2 control plane architecture described in IS-881 and 3GPP2 X.50002, a 3GPP2 user plane architecture described in X.50024, and so on. For clarity, the techniques are described below for SUPL.

Figure 1A:
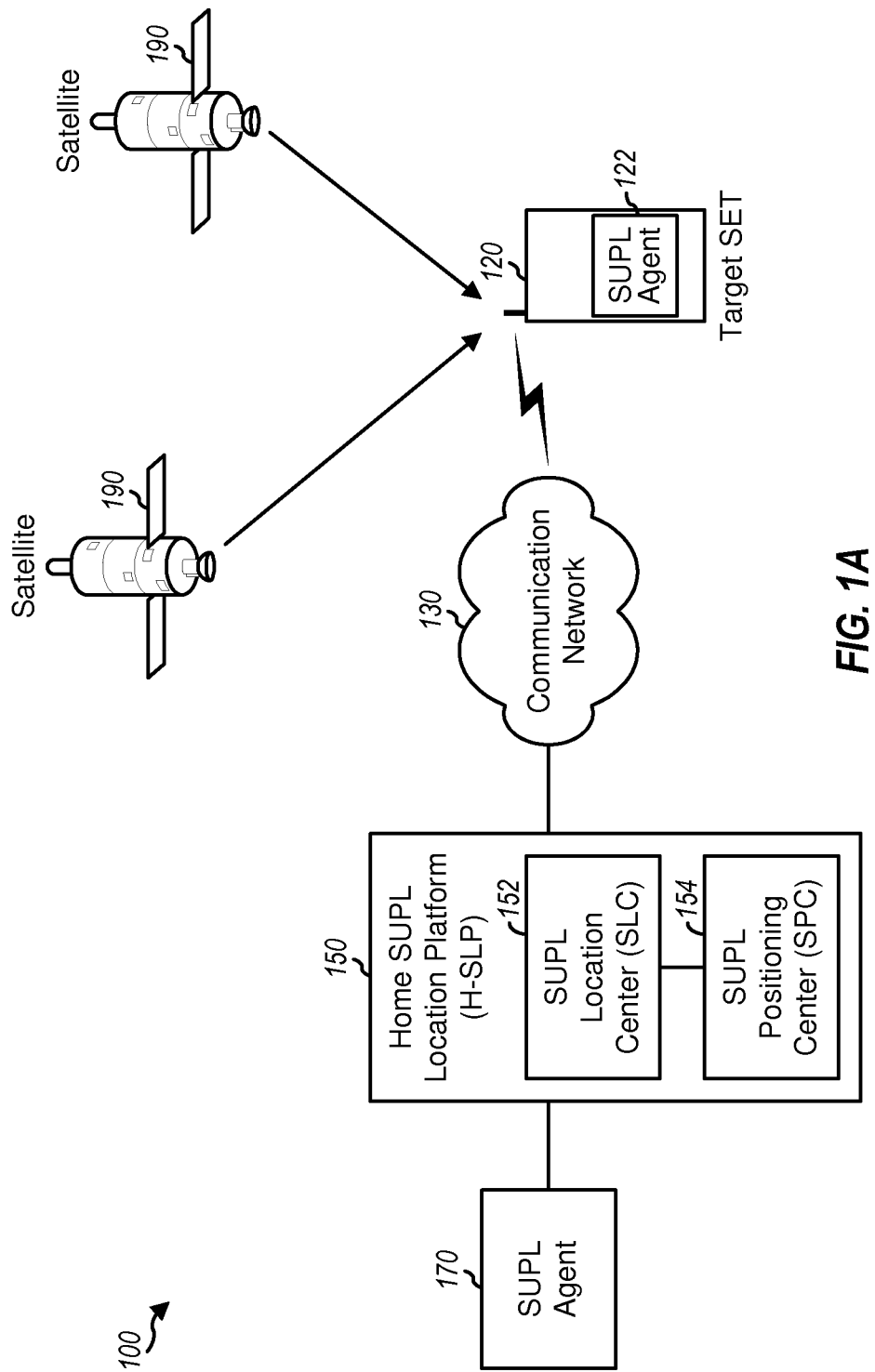
FIGS. 1A and 1B show two exemplary network architectures.

FIG. 1A shows a network architecture 100 capable of providing location services for SUPL enabled terminals (SETs). A SET is a device capable of communicating with SUPL capable entities that support positioning and location services for SETs. For simplicity, only one SET 120 is shown in FIG. 1A. SET 120 may be stationary or mobile and may also be called a mobile station (MS), a user equipment (UE), a terminal, a station, a subscriber unit, or some other terminology. SET 120 may be a cellular phone, a personal digital assistant (PDA), a wireless modem, a personal computer, a laptop computer, a telemetry device, a tracking device, and so on. For example, SET 120 may be a UE in Universal Mobile Telecommunication System (UMTS), an MS in GSM or cdma2000, a personal computer in an IP-based network, and so on.

SET 120 may include a SUPL agent 122 capable of accessing SUPL capable entities. SET 120 may also be a target SET, which is a SET whose position is being sought by a SUPL agent that may be internal or external to the SET. SET 120 may perform functions such as privacy, security, positioning measurement and position calculation for location services.

SET 120 may communicate with a communication network 130 for various services such as voice, packet data, messaging, and so on. SET 120 may also communicate with SUPL capable entities via network 130. Network 130 may be a wireless network such as a cdma2000 network, a UMTS network, a GSM network, some other radio access network (RAN), a WLAN, and so on. Network 130 may also be a wireline network such as an IP-based network, a phone network, a cable network, and so on. SET 120 may also receive signals from one or more satellites 190, which may be part of the Global Positioning System (GPS), the European Galileo system, the Russian Glonass system, or some other satellite positioning system. SET 120 may measure signals from satellites 190 and/or base stations in network 130 and may obtain pseudo-range measurements for the satellites and network measurements from the base stations. The pseudo-range measurements may be used to derive a position estimate for SET 120.

A Home SUPL Location Platform (H-SLP) 150 is responsible for SUPL service management and position determination. SUPL service management may include managing locations of SETs and storing, extracting, and modifying location information of target SETs. H-SLP 150 includes a SUPL Location Center (SLC) 152 and may include a SUPL Positioning Center (SPC) 154. SLC 152 performs various functions for location services, coordinates the operation of SUPL, and interacts with SETs over user plane bearer. SLC 152 may perform functions for privacy, initiation, security, roaming support, charging/billing, service management, position calculation, and so on. SPC 154 supports positioning for SETs, is responsible for messages and procedures used for position calculation, and supports delivery of assistance data to the SETs. SPC 154 may perform functions for security, assistance data delivery, reference retrieval, position calculation, and so on. An SPC has access to GPS receivers (a reference network, perhaps a global one) and receives signals for satellites so that it can provide assistance data.

A SUPL agent (e.g., SUPL agent 122 or 170) is a function or an entity that obtains location information for a target SET. In general, a SUPL agent may reside in a network entity (e.g., SUPL agent 170) or a SET (e.g., SUPL agent 122) or may be external to both the network and the SET. In the case of a SET resident SUPL agent, it may or may not access network resources to obtain the location information and, as in SET-based mode, positioning and resource usage may be not one-for-one. A network resident SUPL agent may utilize Mobile Location Services applications (MLS Apps) to access an H-SLP or an R-SLP. An MLS application is an application that requests and consumes location information. Location information may be any information related to location and may comprise various types of position estimate (e.g., latitude and longitude coordinates, latitude and longitude with an expected error estimate, etc). MLS covers interaction between a SUPL agent and an H-SLP or R-SLP whereas SUPL covers interaction between an H-SLP or V-SLP and a SET.

Figure 1B:
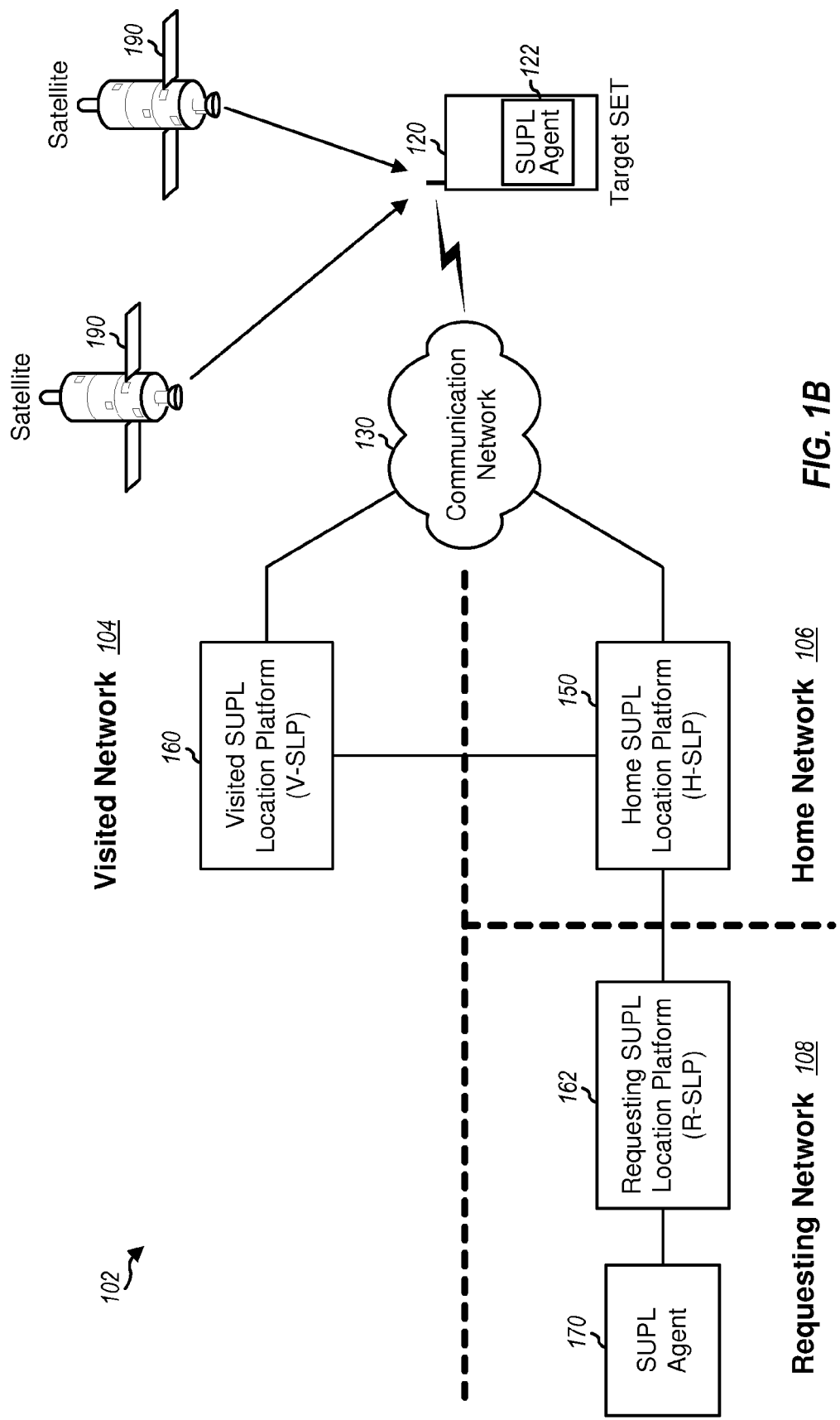

FIG. 1B shows a network architecture 102 that includes a visited/serving network 104, a home network 106, and a requesting network 108. Visited network 104 includes a Visited SUPL Location Platform (V-SLP) 160. Home network 106 includes H-SLP 150 that supports location services and positioning. Requesting network 108 includes a Requesting SLP (R-SLP) 162 that supports location services for SUPL agents. H-SLP 150, V-SLP 160, and R-SLP 162 each includes an SLC and may include an SPC, which operate as described above for FIG. 1A.

The SUPL entities in FIGS. 1A and 1B are described in document OMA-AD-SUPL-V2_0-20060619-D, entitled "Secure User Plane Location Architecture," Draft Version 2.0, June 2006, which is publicly available from OMA. The network entities in FIGS. 1A and 1B may also be referred to by other names in other networks and other location architectures. For example, in a 3GPP-based network (e.g., a UMTS network), an SLC is called a Gateway Mobile Location Center (GMLC), an SPC is called a Serving Mobile Location Center (SMLC), a SET is called a UE, and a SUPL agent is called an LCS client. The functions and signaling performed by the 3GPP entities are similar to those performed by the corresponding SUPL entities, thereby enabling comparable services and capabilities. In general, an SLC may be called a location center, an LCS server, a location server, a Mobile Positioning Center (MPC), and so on. An SPC may be called a positioning entity, a positioning center, a Position Determination Entity (PDE), and so on.

SUPL may support the following positioning methods (among others):

Assisted GPS (A-GPS) or A-Galileo SET assisted only,
A-GPS or A-Galileo SET based only,
A-GPS or A-Galileo SET assisted preferred with A-GPS or A-Galileo SET based as a fallback mode,
A-GPS or A-Galileo SET based preferred with A-GPS or A-Galileo SET assisted as the fallback mode,
Autonomous GPS or autonomous Galileo,
Hybrid,
Advanced forward link trilateration (A-FLT),
Enhanced observed time difference (EOTD),
Observed time difference of arrival (OTDOA), and
Enhanced cell/sector and cell-ID.

For a SET based mode, the position of the SET is determined by the SET, possibly with assistance data from an SPC. For a SET assisted mode, the position of the SET is determined by the SPC with assistance (e.g., measurements) from the SET. The autonomous GPS and A-GPS methods derive a position estimate for the SET based solely on satellite measurements and have high accuracy. The hybrid method derives a position estimate based on both satellite and base station measurements and has high accuracy and high reliability. The A-FLT, EOTD, and OTDOA methods derive a position estimate based on measurements of base station timing made by the SET and has good accuracy. The enhanced cell/sector and cell-ID methods derive a position estimate based on known positions of cell/sectors of a cellular network and have coarse accuracy. For the enhanced cell/sector method, the position estimate may also be derived based on network measurements such as radio signal timing and signal strengths. Network-based positioning methods such as uplink time of arrival (U-TOA) and uplink time difference of arrival (U-TDOA) may also be supported by certain location solutions. The U-TOA and U-TDOA methods derive a position estimate based on measurements of SET timing made by the network and have good accuracy. These various positioning methods are known in the art. The terms "position estimate", "location estimate", and "position fix" are often used interchangeably. A position estimate may be given in coordinates (e.g., latitude and longitude) or a civic address and possibly an expected error.

SUPL may support various location services such as those shown in Table 1.

TABLE 1

| Location Service | Description |
| --- | --- |
| Immediate location service | Provide location information (e.g., the location of a target SET) immediately when requested. |
| Area event location service | Provide location information after a specific event has occurred. |
| Periodic location service | Provide location information multiple times based on periodic triggers. |
| Periodic area event location service | Determine location information periodically but report only when area event triggers occur. |
| Historical location service | Provide location information obtained previously when specified conditions are met. |

Immediate location services may also be referred to as network initiated, SET initiated, roaming, non-roaming, and so on. Periodic, area event, and historical location services are also referred to as periodic, area event, and historical triggered services, respectively. For triggered services, the reporting of position estimates is determined by triggers or trigger mechanism that indicates when to report the SET location to a SUPL agent. The triggers may be determined by the SUPL agent, sent to the H-SLP, and then forwarded to the target SET. Periodic triggers for periodic triggered service may comprise a periodic interval, the number of position reports, and a possible start time to begin reporting. Area event triggers for area event triggered service may correspond to the SET entering, leaving or remaining within a predefined geographic area, the SET location, velocity or acceleration changing by predefined thresholds, and so on. For historical triggered service, the SET may decide to store position estimates/measurements when they are computed/gathered as opposed to sending them directly to the H-SLP. The SET may send prior stored position estimates/measurements when certain predefined conditions are met. For example, the SET may be temporarily out of cellular coverage and may send prior position estimates when it re-enters cellular coverage.

Location services may be categorized as shown in Table 2.

TABLE 2

| Location Service | Description |
| --- | --- |
| Network initiated (NI) services | Services that originate from the network, with the SUPL agent residing in the network. |
| SET initiated (SI) services | Services that originate from the SET, with the SUPL agent residing within the SET. |

Network initiated may also be referred to as mobile terminated. SET initiated may also be referred to as mobile originated.

SUPL supports two communication modes between a SET and an SLP for positioning with an SPC. Table 3 summarizes the two communication modes.

TABLE 3

| Comm Mode | Description |
| --- | --- |
| Proxy mode | The SPC does not have direct communication with the SET, and the SLC acts as a proxy between the SET and the SPC. |
| Non-proxy mode | The SPC has direct communication with the SET. |

SUPL supports roaming and non-roaming for a SET. Table 4 summarizes several roaming and non-roaming modes.

TABLE 4

| Roaming/Non-roaming | Description |
| --- | --- |
| Non-roaming | The SET is within the service area of its H-SLP. |
| Roaming with H-SLP positioning | The SET is outside the service area of its H-SLP, but the H-SLP still provides location functionality. |
| Roaming with V-SLP positioning | The SET is outside the service area of its H-SLP, and a V-SLP provides location functionality |

As used herein, roaming and non-roaming are with respect to SUPL, and not with respect to communication network 130. Network 130 may have different definition and criteria on roaming and non-roaming, which are not discussed herein.

The service area of an H-SLP is an area within which the H-SLP can provide a position estimate for a SET or relevant assistance data to a SET without contacting other SLPs. When the SET is roaming, the H-SLP may provide location functionality (e.g., position determination and SPC functionality) or may request a V-SLP to provide this location functionality.

A set of message flows may be defined for each of the supported location services. Each message flow may be applicable for a specific location service and a specific set of conditions, e.g., proxy or non-proxy, roaming or non-roaming, network initiated or SET initiated, and so on. A specific message flow may be used to obtain the desired location service for the applicable conditions.

Figure 2:
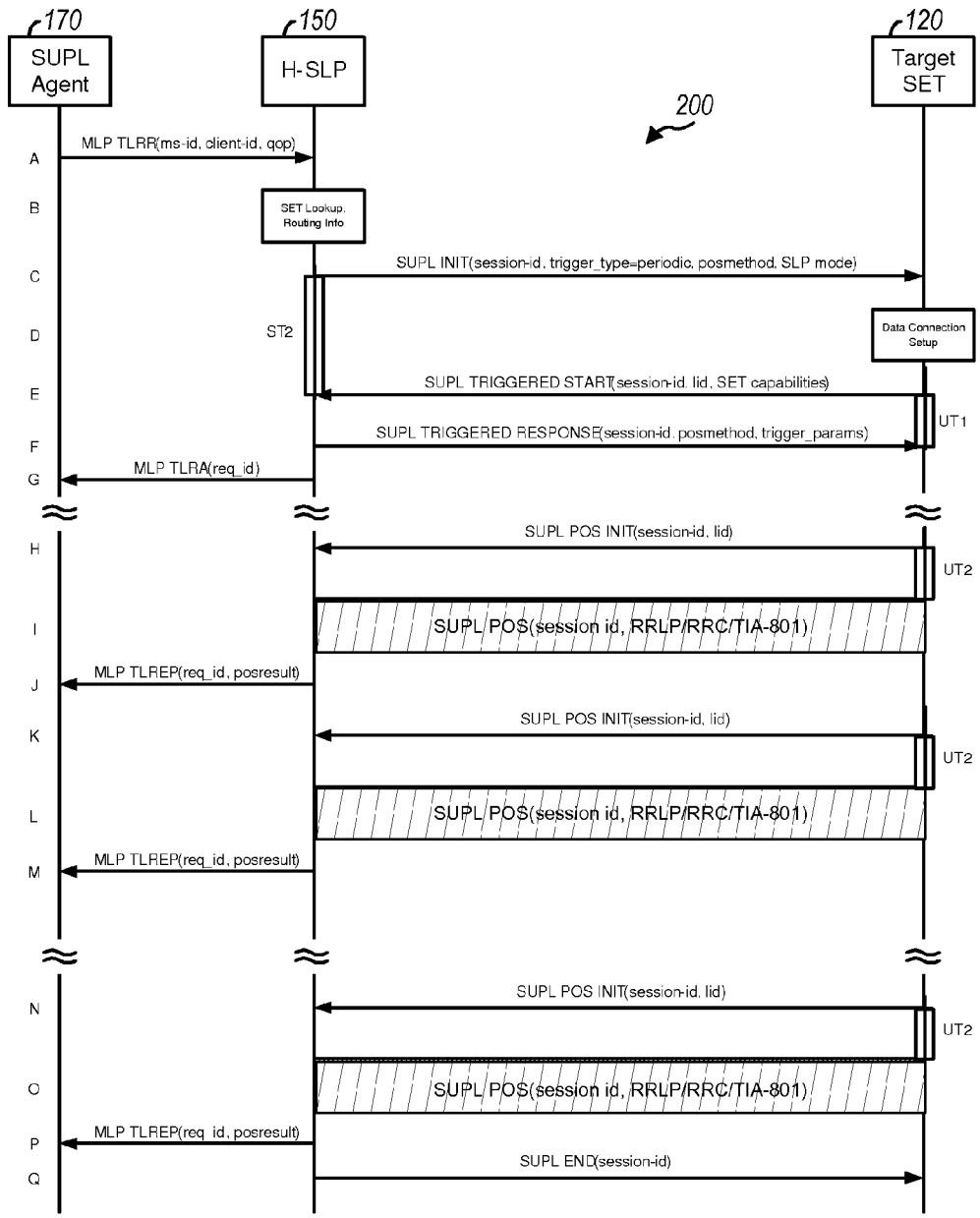
FIGS. 2 to 18 show exemplary message flows for triggered location services.

For clarity, a number of exemplary message flows for different location services and conditions are described below. Table 5 summarizes the message flows shown in FIGS. 2 through 18 below. Each row in Table 5 is for one message flow in the figures, and the "Xs" in the row indicate the conditions applicable for that message flow. For example, the first row indicates that FIG. 2 is for periodic location service, proxy mode, network initiated, and non-roaming. The non-roaming message flows are applicable for the network architecture shown in FIG. 1A. The roaming message flows are applicable for the network architecture shown in FIG. 1B. Many of the SUPL messages in the message flows are described in document OMA-TS-ULP-V1_0-20060704-C, entitled "User Plane Location Protocol," Candidate Version 1.0, July 2006, and in document OMA-TS-ULP-V2_0-20060727-D, entitled "UserPlane Location Protocol," Draft Version 2.0, Jul. 27, 2006, which are publicly available from OMA. Fewer, different and/or additional message flows may also be defined for locations services.

TLRR) message to H-SLP 150 (step A). H-SLP 150 is an SLP with which SUPL agent 170 is associated. The MLP TLRR message may include a client identifier (ID) for SUPL agent 170 (client-id), a mobile station ID (ms-id) for target SET 120, and quality of position (QoP). The QoP indicates the quality of the position estimates being requested, which may be quantified by the required accuracy of the position estimates and/or other criteria. The message may also carry periodic trigger or other event trigger information, e.g., a reporting period and number of reports.

H-SLP 150 authenticates SUPL agent 170 and checks if the SUPL agent is authorized for the requested location service based on the client ID. H-SLP 150 also applies subscriber privacy against SUPL agent 170 based on the mobile station ID. For the privacy check, H-SLP 150 may verify if SUPL agent 170 or this type of SUPL agent is allowed to request periodic location information for SET 120 and whether SET 120 may need to be notified of this request and allowed to accept or reject the request. H-SLP 150 then looks up SET 120, verifies that SET 120 is currently not roaming, and may also verify that SET 120 supports SUPL (step B). H-SLP 150 obtains routing information for SET 120 and uses the routing information to send messages to the SET (also step B).

H-SLP 150 initiates a SUPL/location session for periodic triggered service with SET 120 by sending a SUPL INIT message, e.g., using Wireless Application Protocol (WAP) push, Short Message Service (SMS) trigger, or UDP/IP (step C). The SUPL INIT message may include a session ID (session-id), a trigger type indicator, a proxy/non-proxy mode indicator (SLP mode), a proposed positioning method (posmethod), QoP, a key identity (Key Id), a message authentication code (MAC), and/or other information. The session ID includes a SET session ID selected by SET 120 concatenated with an SLP session ID selected by H-SLP 150. The session ID is used to identify this SUPL session. Multiple simultaneous SUPL sessions may be supported on both H-SLP 150 and SET 120 with different session IDs. For message flow 200, the trigger type indicator indicates peri-

TABLE 5

| FIG. | Location Service | | | Comm Mode | | Initiated by | | Roaming/ Non-roaming | | |
|---|---|---|---|---|---|---|---|---|---|---|
| | Periodic | Area Event | Historic | Proxy | Non-proxy | Network | SET | Non-roam | Roam V-SLP | Roam H-SLP |
| 2 | X | | | X | | X | | X | | |
| 3 | X | | | X | | X | | X | | |
| 4 | X | | | X | | X | | | X | |
| 5 | X | | | X | | X | | | | X |
| 6 | X | | | X | | | X | X | | |
| 7 | X | | | | X | X | | X | | |
| 8 | | X | | X | | X | | X | | |
| 9 | | X | | X | | X | | | X | |
| 10 | | X | | X | | X | | | | X |
| 11 | | X | | X | | | X | X | | |
| 12 | | X | | | X | X | | X | | |
| 13 | | | X | X | | X | | X | | |
| 14 | | | X | X | | | X | X | | |
| 15 | X | X | | X | | X | | | X | |
| 16 | X | | | X | | X | | X | | |
| 17 | X | | | X | | X | | X | | |
| 18 | X | | | X | | | X | X | | |

FIG. 2 shows an embodiment of a message flow 200 for network initiated periodic triggered service for non-roaming in proxy mode. SUPL agent 170 desires periodic position estimates for target SET 120 and sends a Mobile Location Protocol Triggered Location Response Request (MLP odic triggered service as the requested location service, and the proxy/non-proxy mode indicator indicates proxy mode. The Key Id identifies a MAC master key used to verify the MAC and authenticate the SUPL INIT message. The SUPL INIT message may also include a notification element if the result of the privacy check in step A indicates that notification or verification to target SET 120 is needed. H-SLP 150 also computes and stores a hash of the SUPL INIT message prior to sending the message to SET 120.

SET 120 receives the SUPL INIT message from H-SLP 150 and either attaches itself to a packet data network if the SET is not already attached or establishes a circuit-switched data connection (step D). SET 120 may determine if the SUPL INIT message is authentic based on the Key Id and MAC, if these parameters are included in the message and are supported by the SET.

SET 120 evaluates notification rules and follows the appropriate actions. SET 120 also checks the proxy/non-proxy mode indicator to determine if H-SLP 150 uses proxy or non-proxy mode. In message flow 200, the proxy mode is used, and SET 120 establishes a secure IP connection to H-SLP 150 using an H-SLP address that is provisioned on the SET by the home network. SET 120 then sends a SUPL TRIGGERED START message to start the periodic triggered session with H-SLP 150. This message may include the session ID, a location ID (lid), the capabilities of SET 120, a hash of the SUPL INIT message (Ver), and so on. The location ID provides cell information for SET 120. The SET capabilities may include the positioning methods supported by SET 120 (e.g., A-GPS SET assisted, A-GPS SET based, and so on), the positioning protocols supported by SET 120 (e.g., Radio Resource LCS Protocol (RRLP) in 3GPP, Radio Resource Control (RRC) in 3GPP, TIA-801, and so on), and/or other information. SET 120 sends the SUPL TRIGGERED START message even if the proposed positioning method included in the SUPL INIT message is not among the positioning methods supported by the SET.

H-SLP 150 receives the SUPL TRIGGERED START message and may compare the received hash with the stored hash to determine whether the SUPL INIT message was properly received. H-SLP 150 selects a positioning method to use for the periodic triggered session by considering the SET capabilities included in the SUPL TRIGGERED START message. H-SLP 150 then sends to SET 120 a SUPL TRIGGERED RESPONSE message that includes the session ID, the selected positioning method (posmethod), and periodic triggers (step F). Alternatively, H-SLP 150 may send a list of supported positioning methods (which may or may not be prioritized) in step C, and SET 120 may select one of the supported positioning methods and return the selected positioning method in step E. In any case, after step F, SET 120 and H-SLP 150 may release the secure IP connection. H-SLP 150 sends an MLP Triggered Location Reporting Answer (TLRA) message to inform SUPL agent 170 that the triggered location request has been accepted (step G). This message may include a request ID (req_id) to be used as a transaction ID for the entire duration of the periodic triggered session. The request ID is used for MLP between SUPL agent 170 and H-SLP 150, and the session ID is used for SUPL between SET 120 and H-SLP 150.

Steps A through G are setup steps for periodic triggered service. Step C initiates and notifies SET 120 of the SUPL session. Step F completes the initiation phase and starts the reporting phase. Location information for SET 120 may thereafter be reported in accordance with the periodic triggers determined in the setup steps and sent in step F.

When the first position estimate is due, as indicated by the periodic triggers, SET 120 attaches itself to the packet data network if it is not already attached or establishes a circuit-switched data connection. SET 120 then sends a SUPL POS INIT message to initiate a positioning session (e.g., a positioning protocol session in RRLP, RRC, or TIA-801) with H-SLP 150 (step H). This message may include the session ID, a location ID, and/or other information. SET 120 may provide a network measurement report (NMR) specific for a radio technology being used. For example, the NMR may include time of arrival (TA) and/or received signal level (RXLEV) for GSM and may include other measurements for other radio technologies. SET 120 may also provide its position, if available. SET 120 may also request for assistance data, e.g., by setting a Requested Assistance Data element in the SUPL POS INIT message, and may then exchange messages with H-SLP 150 to download the requested assistance data to the SET. The assistance data may be any data that is useful for position determination and may be dependent on positioning methods. The assistance data may comprise Almanac and Ephemeris data for A-GPS positioning and may comprise other data for other positioning methods.

H-SLP 150 receives the SUPL POS INIT message and determines if a suitable position estimate is available. A suitable position estimate is a position estimate that meets the specified QoP. If H-SLP 150 can calculate a suitable position estimate (e.g., a cell-id based position estimate) based on information included in the SUPL POS INIT message, then H-SLP 150 can proceed directly to step J and does not engage in a SUPL POS session (or positioning session) in step I. Otherwise, H-SLP 150 and SET 120 engage in a SUPL POS session and may exchange several successive positioning procedure messages (step I). H-SLP 150 and SET 120 may employ a SUPL POS message to exchange positioning procedure messages (RRLP/RRC/TIA-801) used to calculate a position estimate for the SET. For SET-assisted mode, H-SLP 150 may calculate a position estimate based on positioning measurements received from SET 120. For SET-based mode, SET 120 may calculate a position estimate based on assistance obtained from H-SLP 150. In any case, once a suitable position estimate is available, H-SLP 150 sends to SUPL agent 170 a MLP Triggered Location Report (TLREP) message that includes the request ID and the position result (posresult). The position result may include a position estimate, the date and time for the position estimate, the positioning method used to derive the position estimate, and/or other information. SET 120 may release the secure IP connection to H-SLP 150 after step I.

A second position estimate may be obtained and reported in steps K through M, which correspond to steps H through J, respectively. Each subsequent position estimate may be obtained and reported in similar manner. The last position estimate is obtained and reported in steps N through P. After the last position result has been reported to SUPL agent 170 in step P, H-SLP 150 ends the periodic triggered session, which is started in step C, by sending a SUPL END message to SET 120 (step Q).

In message flow 200, H-SLP 150 may set an ST2 timer upon sending the SUPL INIT message in step C and may abort the session if a SUPL TRIGGERED START message is not received from SET 120 prior to expiration of the ST2 timer. Similarly, SET 120 may set a UT1 timer upon sending the SUPL TRIGGERED START message in step E and may abort the session if a SUPL TRIGGERED RESPONSE message is not received from H-SLP 150 prior to expiration of the UT1 timer. SET 120 may also set a UT2 timer upon sending a SUPL POS INIT message and may abort a positioning session if a response is not received from H-SLP 150 prior to expiration of the UT2 timer. The timers may be set to any suitable values.

Message flow 200 may also be used for (non area) event triggered location. Message flow 200 may also be used for all positioning methods. For A-GPS SET based mode, no GPS assistance data is needed from H-SLP 150, and SET 120 autonomously calculates a position estimate using GPS assistance data currently available at the SET. A simpler message flow may be used for A-GPS SET based mode.

Figure 3:
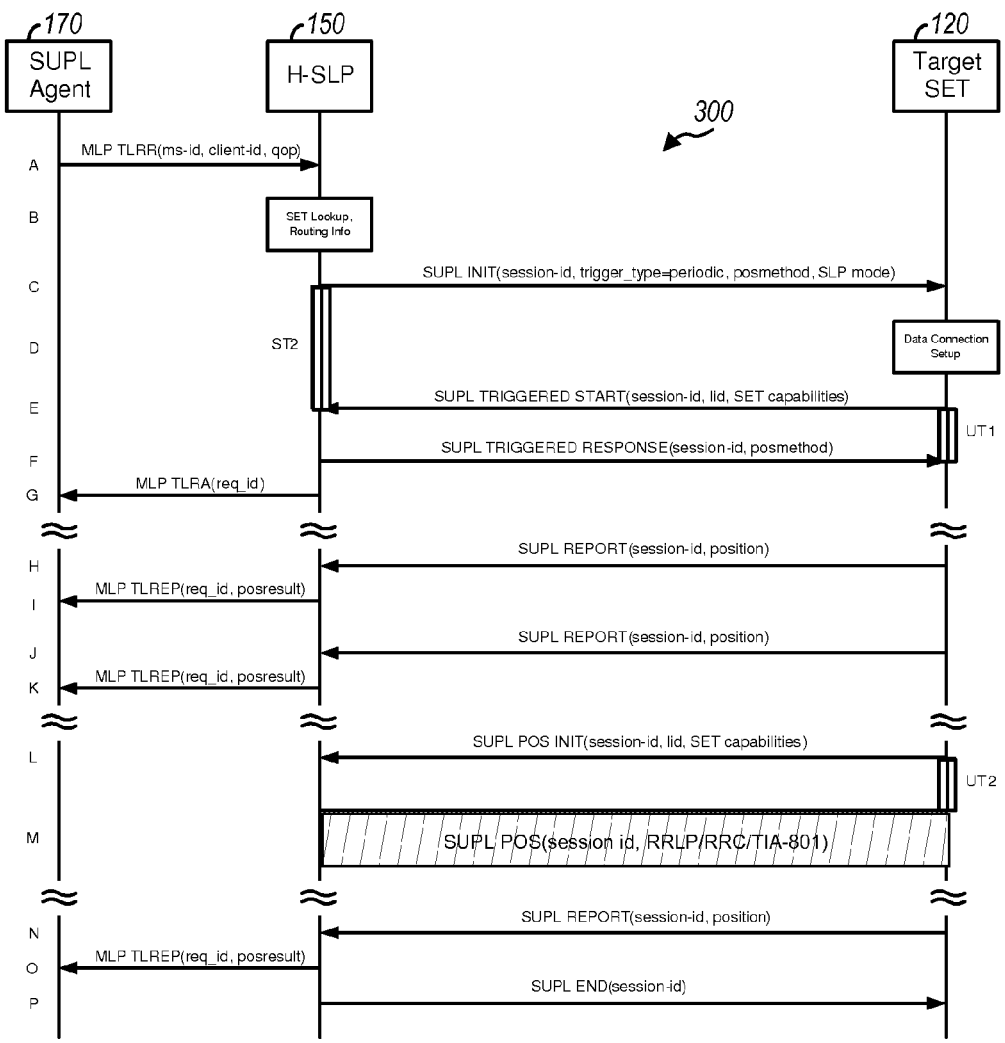

FIG. 3 shows an embodiment of a message flow 300 for network initiated periodic triggered service for non-roaming in proxy mode for A-GPS SET based mode. Setup steps A through G in message flow 300 are the same as steps A through G in message flow 200. When the first position estimate is due, SET 120 calculates a position estimate without interacting with H-SLP 150 and sends the position result in a SUPL REPORT message to the H-SLP (step H). H-SLP 150 forwards the position result in an MLP TLREP message to SUPL agent 170 (step I). Each subsequent position estimate may be obtained and reported in similar manner. If SET 120 desires updated assistance data, then the SET sends a SUPL POS INIT message (step L) and engages in a SUPL POS session with H-SLP 150 to receive the requested assistance data (step M). Steps L and M are performed whenever SET 120 desires updated assistance data. After the last position result has been reported to SUPL agent 170 in step O, H-SLP 150 ends the periodic triggered session by sending a SUPL END message to SET 120 (step P).

Figure 4:
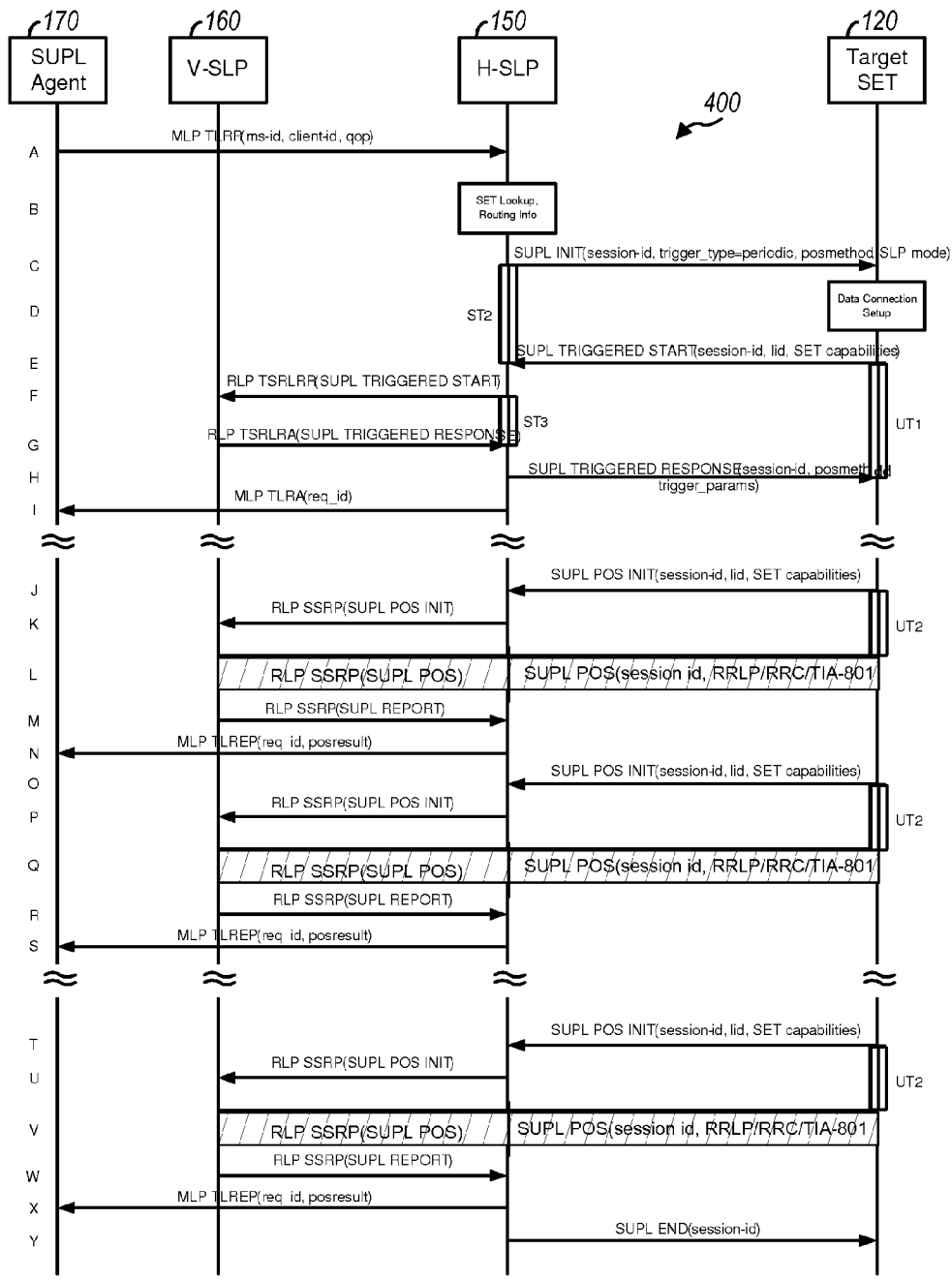

FIG. 4 shows an embodiment of a message flow 400 for network initiated periodic triggered service for roaming with V-SLP positioning in proxy mode. Steps A through E of message flow 400 are similar to steps A through E of message flow 200 in FIG. 2. However, in step B of message flow 400, H-SLP 150 determines that SET 120 is roaming. H-SLP 150 receives the SUPL TRIGGERED START message from SET 120 in step E and determines V-SLP 160 based on the location ID included in the received message or some other mechanism. H-SLP 150 then sends to V-SLP 160 a Roaming Location Protocol Triggered SUPL Roaming Location Reporting Request (RLP TSRLRR) message that includes the SUPL TRIGGERED START message (step F). The RLP TSRLRR message informs V-SLP 160 that target SET 120 will initiate a SUPL positioning procedure. V-SLP 160 selects a positioning method by considering the SET capabilities included in the SUPL TRIGGERED START message. V-SLP 160 indicates its readiness for the SUPL positioning procedure by sending a SUPL TRIGGERED RESPONSE message in an RLP Triggered SUPL Roaming Location Reporting Answer (RLP TSRLRA) message to H-SLP 150 (step G). H-SLP 150 forwards the SUPL TRIGGERED RESPONSE message, which includes the session ID and the selected positioning method, to SET 120 (step H). H-SLP 150 also sends an MLP TLRA message to inform SUPL agent 170 that the request sent in step A has been accepted.

For the first position estimate, SET 120 sends a SUPL POS INIT message to H-SLP 150 to start a positioning session with V-SLP 160 (step J). If the SUPL POS INIT message contains a suitable position estimate, then H-SLP 150 proceeds directly to step N. Otherwise, H-SLP 150 forwards the SUPL POS INIT message in an RLP Standard SUPL Roaming Position (RLP SSRP) message to V-SLP 160 (step K). V-SLP 160 may proceed directly to step M and not engage in a SUPL POS session if a suitable position estimate can be calculated based on the information received in the SUPL POS INIT message. Otherwise, V-SLP 160 and SET 120 engage in a SUPL POS session and may exchange several successive positioning procedure messages, which may be tunneled over RLP via H-SLP 150 (step L). V-SLP 160 or SET 120 calculates a position estimate. V-SLP 160 then sends to H-SLP 150 a SUPL REPORT message that includes the session ID and the position estimate (step M). H-SLP 150 then sends to SUPL agent 170 an MLP TLREP message containing the request ID and the position estimate (step N). Each subsequent position estimate may be obtained and reported in similar manner. After reporting the last position result, H-SLP 150 ends the periodic triggered session by sending a SUPL END message to SET 120 (step Y).

Figure 5:
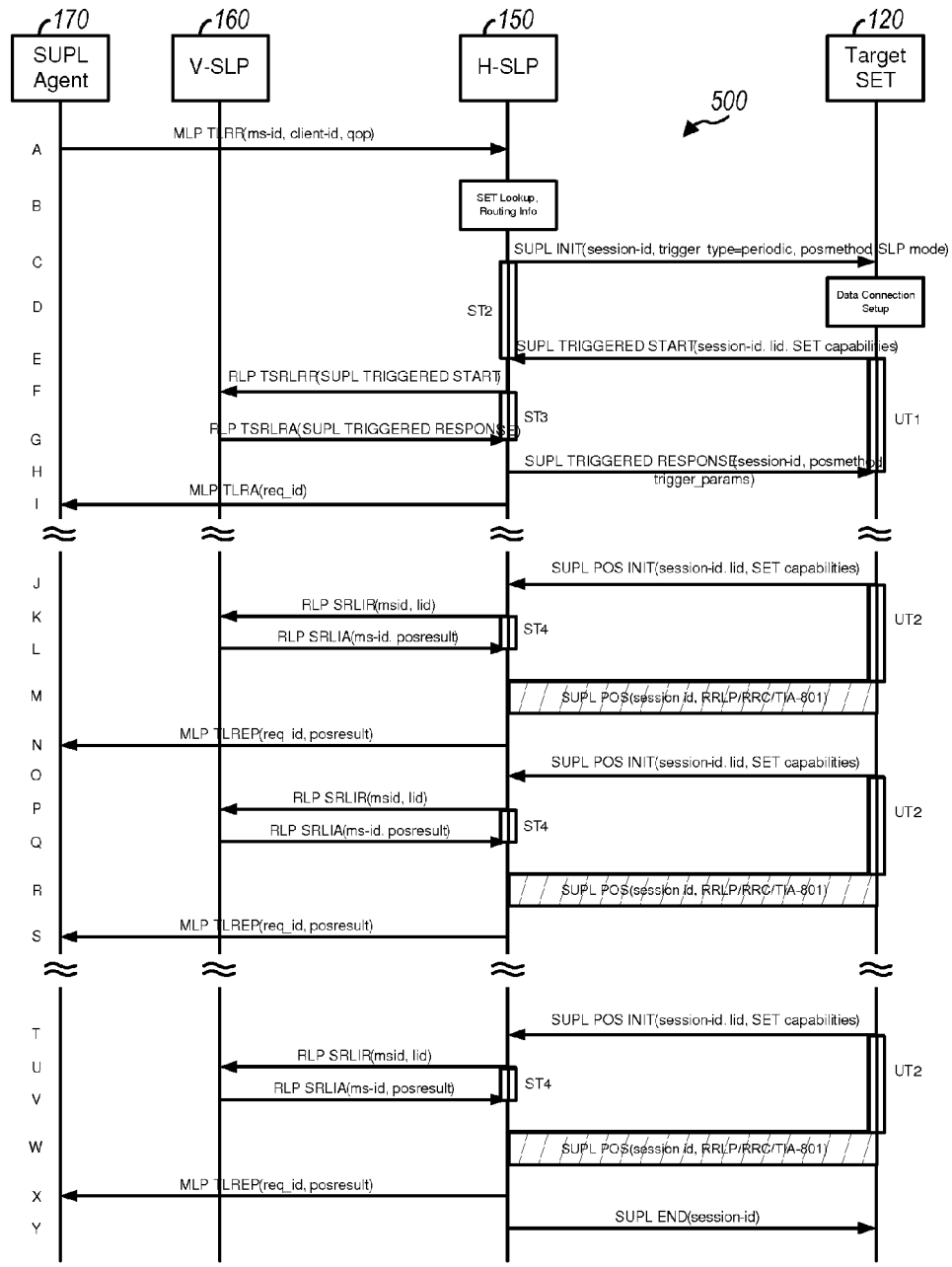

FIG. 5 shows an embodiment of a message flow 500 for network initiated periodic triggered service for roaming with H-SLP positioning in proxy mode. Steps A through I of message flow 500 are similar to steps A through I of message flow 400 in FIG. 4. However, H-SLP 150 sends an RLP TSRLRR message to inform V-SLP 160 that a periodic triggered session is being initiated with the H-SLP (step F) and selects a positioning method for the periodic triggered session (step H).

For the first position estimate, SET 120 sends a SUPL POS INIT message to H-SLP 150 to start a positioning session with the H-SLP. H-SLP 150 may send an RLP SRLIR message to V-SLP 160 to obtain a coarse position of SET 120 based on the location ID received in step J (step K). V-SLP 160 may translate the location ID into a coarse position and returns the result in an RLP SRLIA message to H-SLP 150 (step L). H-SLP 150 may use the coarse position as a final position estimate if it is sufficiently accurate or may use the coarse position to obtain assistance data to send to SET 120 in step M. H-SLP 150 and SET 120 may engage in a SUPL POS session to obtain a more accurate position estimate for the SET (step M). H-SLP 150 then sends the position estimate in an MLP TLREP message to SUPL agent 170 (step N). Each subsequent position estimate may be obtained and reported in similar manner. After reporting the last position result, H-SLP 150 ends the periodic triggered session by sending a SUPL END message to SET 120 (step Y).

Figure 6:
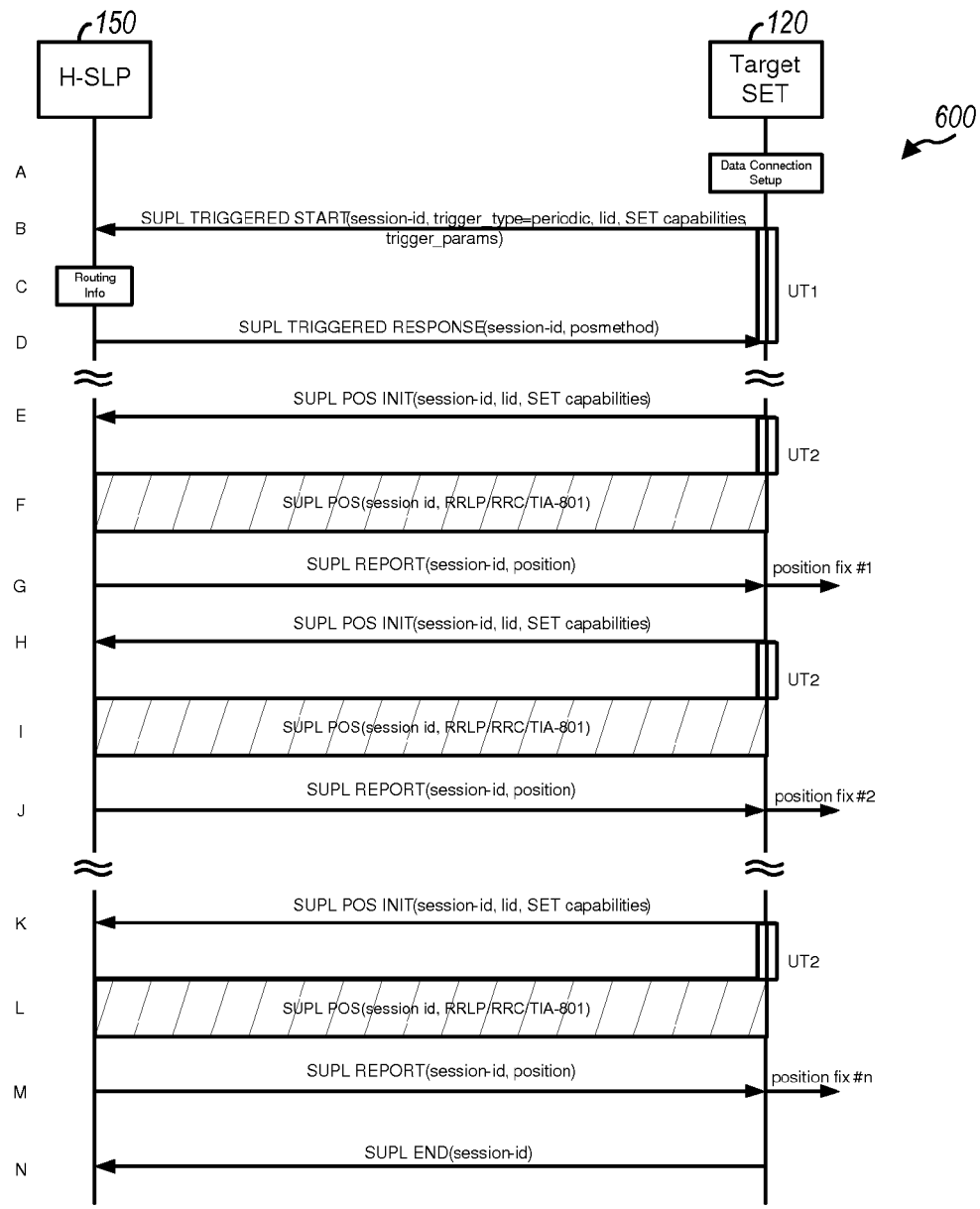

FIG. 6 shows an embodiment of a message flow 600 for SET initiated periodic triggered service for non-roaming in proxy mode. SUPL agent 122 residing on SET 120 (as shown in FIGS. 1A and 1B) receives a request for periodic triggered service from an application running on the SET. SET 120 attaches to the packet data network or establishes a circuit-switched data connection (step A). SUPL agent 122 uses a default address provisioned by the home network to establish a secure IP connection to H-SLP 150 and sends a SUPL TRIGGERED START message to start a SUPL session with the H-SLP (step B). This message may include a session ID, the SET capabilities, a trigger type indicator, and a location ID. H-SLP 150 verifies that SET 120 is currently not SUPL roaming, selects a positioning method consistent with the SET capabilities, and determines routing information for SET 120 (step C). H-SLP 150 then sends to SET 120 a SUPL TRIGGERED RESPONSE message containing the session ID, the positioning method, but no H-SLP address to indicate to the SET that a new connection will not be established (step D). SET 120 and H-SLP 150 may release the secure IP connection.

For the first position estimate, SET 120 sends a SUPL POS INIT message to start a positioning session with H-SLP 150 (step E). This message may include the session ID, the SET capabilities, a location ID, an NMR, a position estimate, and so on. SET 120 may also set a Requested Assistance Data element in the SUPL POS INIT message. If a suitable position estimate is available, then H-SLP 150 directly proceeds to step G and does not engage in a SUPL POS session. Otherwise, SET 120 and H-SLP 150 may exchange several successive positioning procedure messages and either the H-SLP or the SET calculates a position estimate (step F). H-SLP 150 then sends to SET 120 a SUPL REPORT message containing the session ID and the position estimate (step G). For A-GPS SET based mode, steps E to G may be omitted, and SET 120 may autonomously calculate a position estimate based on GPS assistance data available in the SET. Each subsequent position estimate may be obtained and reported in similar manner. After obtaining the last position result, SET 120 ends the periodic triggered session by sending a SUPL END message to H-SLP 150 (step N).

Figure 7:
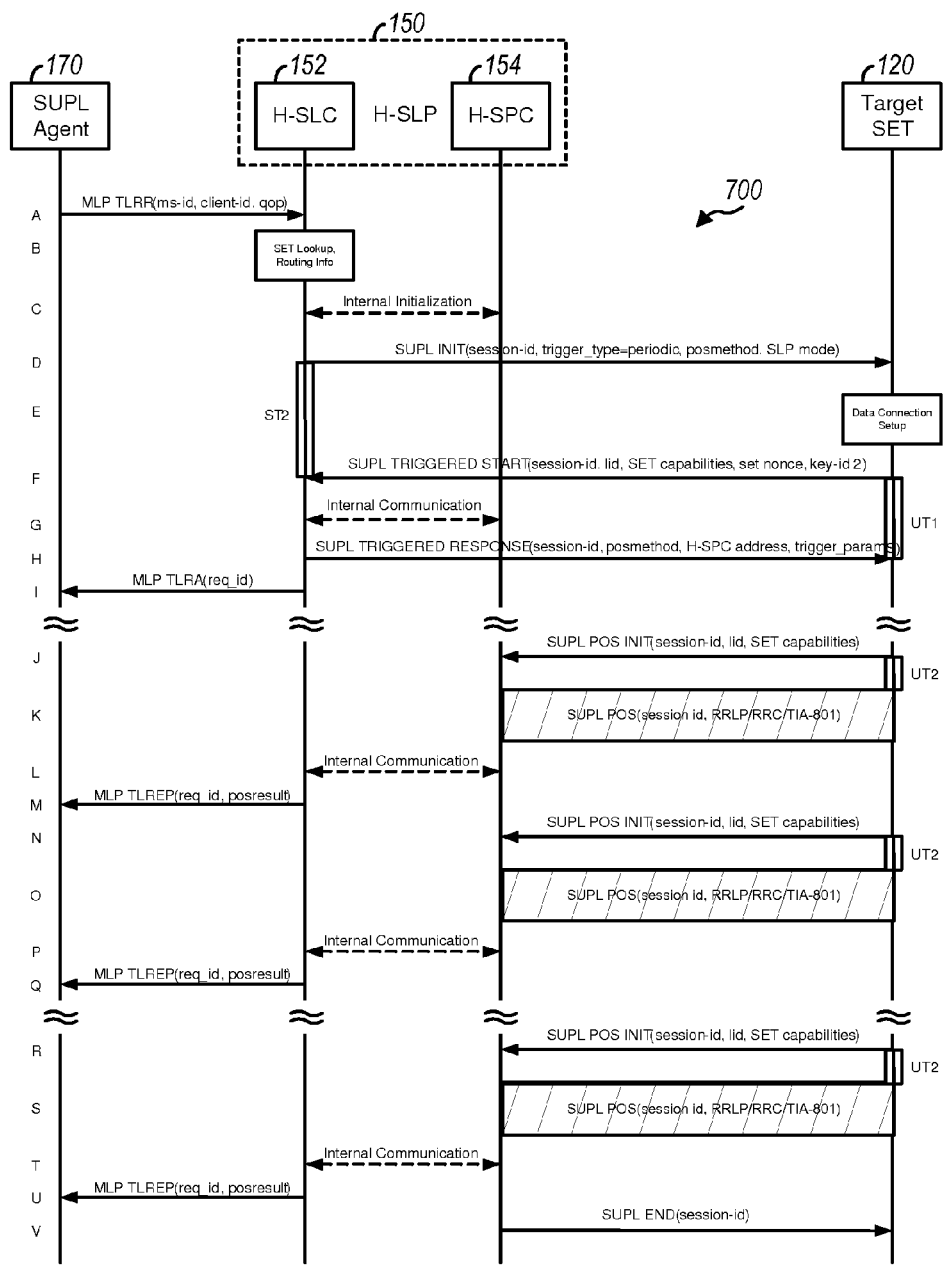

FIG. 7 shows an embodiment of a message flow 700 for network initiated periodic triggered service for non-roaming in non-proxy mode. Message flow 700 includes all of the steps of message flow 200 in FIG. 2 and further includes additional steps for communication between SLC 152 and SPC 154 within H-SLP 150. SUPL agent 170 sends an MLP TLRR message to H-SLC 152 (step A). H-SLC 152 verifies that SET 120 is currently not roaming and obtains routing information for the SET (step B). H-SLC 152 requests service for a periodic triggered session from H-SPC 154 (step C). H-SPC 154 grants or denies the request and informs H-SLC 152 accordingly (also step C).

H-SLC 152 initiates the periodic triggered session with SET 120 (step D). SET 120 attaches itself to the packet data network or establishes a circuit-switched data connection (step E) and starts the periodic triggered session with H-SLP 150 (step F). For authentication in the non-proxy mode, SET 120 includes a SET nonce and a key-id 2 in the SUPL TRIGGERED START message sent to H-SLC 152 in step F. The key-id 2 corresponds to a PP2_SPC_Master_key used to generate a PSK_SPC_Key, which is used for a PSK-TLS session between H-SPC 154 and SET 120. H-SLC 152 uses the key-id 2 and SET nonce to create a key to use for mutual H-SPC and SET authentication. H-SLC 152 forwards the created key to H-SPC 154 through internal communication (step G). H-SLC 152 selects a positioning method for the periodic triggered session and sends a SUPL TRIGGERED RESPONSE message containing the session ID, the positioning method, and the H-SPC address to SET 120 (step H). H-SLC 152 also informs SUPL agent 170 that the request has been accepted (step I).

For the first position estimate, SET 120 sends a SUPL POS INIT message to start a positioning session with H-SPC 154 (step J). SET 120 and H-SPC 154 may exchange positioning procedure messages and calculates a position estimate for the SET (step K). H-SPC 154 then sends the position estimate through internal communication to H-SLC 152 (step L), which in turn sends the position result to SUPL Agent 170 (step M). Each subsequent position estimate may be obtained and reported in similar manner. H-SPC 154 is informed of the end of the periodic triggered session through internal communication in step T. After the last position result has been reported, H-SPC 154 ends the periodic triggered session by sending a SUPL END message to SET 120 (step V).

For area event triggered service, SET 120 may store area event triggers, continually update its position, and determine whether an area event trigger has occurred based on its current position. For simplicity, the message flows below are for cases in which a single area event trigger ends an area event triggered session. In general, area event triggers may occur any number of times before ending the area event triggered session.

Figure 8:
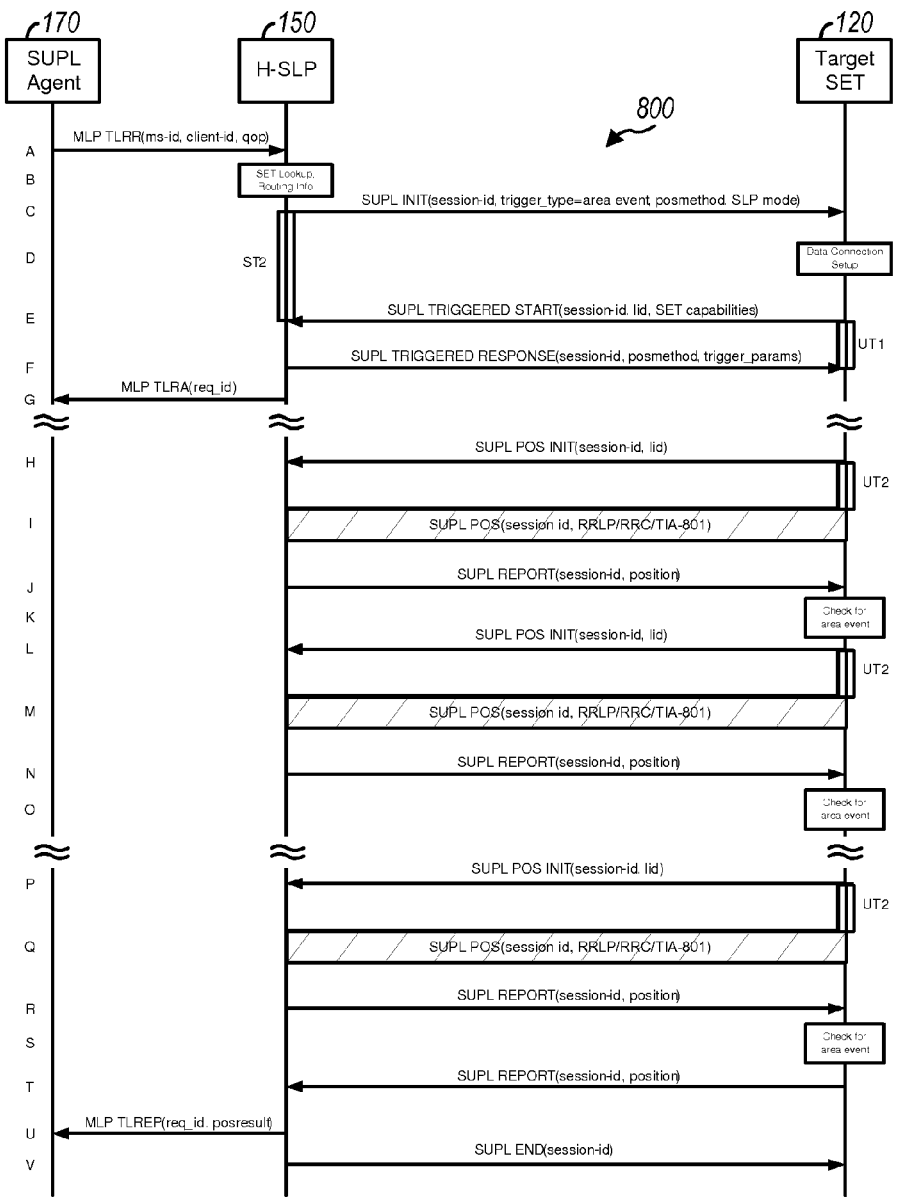

FIG. 8 shows an embodiment of a message flow 800 for network initiated area event triggered service for non-roaming in proxy mode. Steps A through G of message flow 800 are similar to steps A through G of message flow 200 in FIG. 2, with the following differences. SUPL agent 170 requests area event location information in the MLP TLRR message sent to H-SLP 150 in step A. H-SLP 150 initiates an area event trigger session with SET 120 by sending a SUPL INIT message with the trigger type indicator set to area event in step C. H-SLP 150 may include a definition of the event area in the SUPL TRIGGERED RESPONSE message sent to SET 120 in step F.

When the first position estimate is due, as indicated by an area event trigger mechanism in SET 120, the SET sends a SUPL POS INIT message to start a positioning session with H-SLP 150 (step H). H-SLP 150 and SET 120 may engage in a SUPL POS session and obtain a position estimate for the SET (step I). If the position estimate is calculated by H-SLP 150, then the H-SLP sends the position estimate in a SUPL REPORT message to SET 120 (step J). SET 120 compares the position estimate with the event area and determines if an event trigger condition has been met (step K). In this example, area event is not triggered at step J. Steps H to K are repeated whenever the area event trigger mechanism in SET 120 indicates that a new position estimate should be obtained. In this example, the area event is triggered in step S. SET 120 then sends a SUPL REPORT message containing the session ID and the position estimate to H-SLP 150 (step T). H-SLP 150 sends the position estimate in an MLP TLREP message to SUPL agent 170 (step U). H-SLP 150 ends the area event triggered session by sending a SUPL END message to SET 120 (step V).

Message flow 800 may be used for various positioning methods. However, certain steps within message flow 800 may be omitted for some positioning methods. For example, steps I, M and Q for SUPL POS sessions may be omitted for cell-id based positioning methods. Steps J, N and R for sending position estimates to SET 120 may be performed if the position estimates are calculated in H-SLP 150, e.g., for A-GPS SET assisted and cell-ID based modes. Steps H through R, except for steps K and O, may be omitted for A-GPS SET based mode where no GPS assistance data is needed from the network and no interaction with H-SLP 150 is required to calculate a position estimate. For A-GPS SET based mode, steps H and I may be performed whenever interaction with H-SLP 150 is needed for GPS assistance data update.

Figure 9:
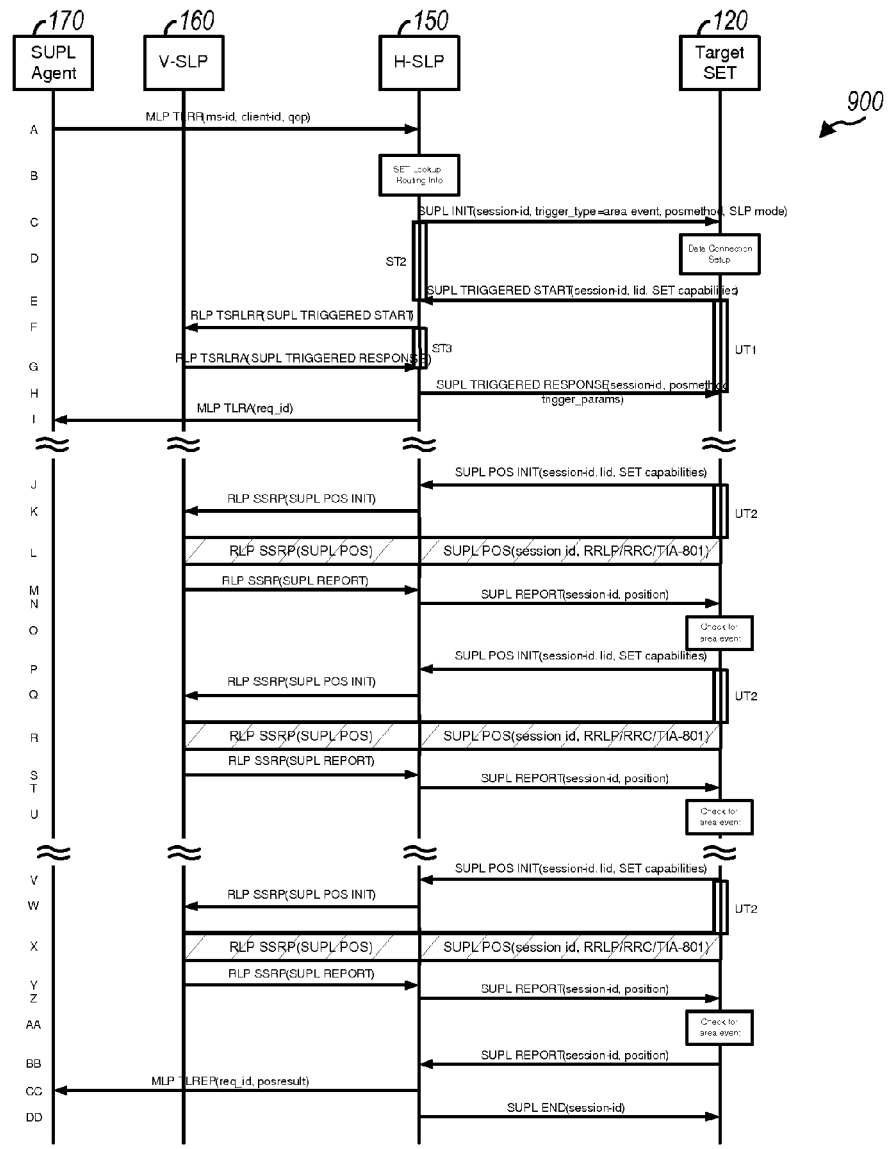

FIG. 9 shows an embodiment of a message flow 900 for network initiated area event triggered service for roaming with V-SLP positioning in proxy mode. Steps A through I of message flow 900 are similar to steps A through I of message flow 400 in FIG. 4, except that area event triggered service (instead of periodic triggered service) is requested in steps A and C. H-SLP 150 may include a definition of the event area in the SUPL TRIGGERED RESPONSE message sent to SET 120 in step H.

For the first position estimate indicated by the area event trigger mechanism in SET 120, steps J to M are performed in similar manner as steps J through M in message flow 400. If the position estimate is calculated in V-SLP 160 or H-SLP 150, then H-SLP 150 sends the position estimate in a SUPL REPORT message to SET 120 (step N). SET 120 compares the position estimate with the event area and determines if an event trigger condition has been met (step O). Steps J to N are repeated whenever the area event trigger mechanism in SET 120 indicates a new position estimate should be obtained. When the area event is triggered in step AA, SET 120 sends a SUPL REPORT message containing the session ID and the position estimate to H-SLP 150 (step BB). H-SLP 150 forwards the position estimate to SUPL agent 170 (step CC) and ends the area event triggered session by sending a SUPL END message to SET 120 (step DD).

Figure 10:
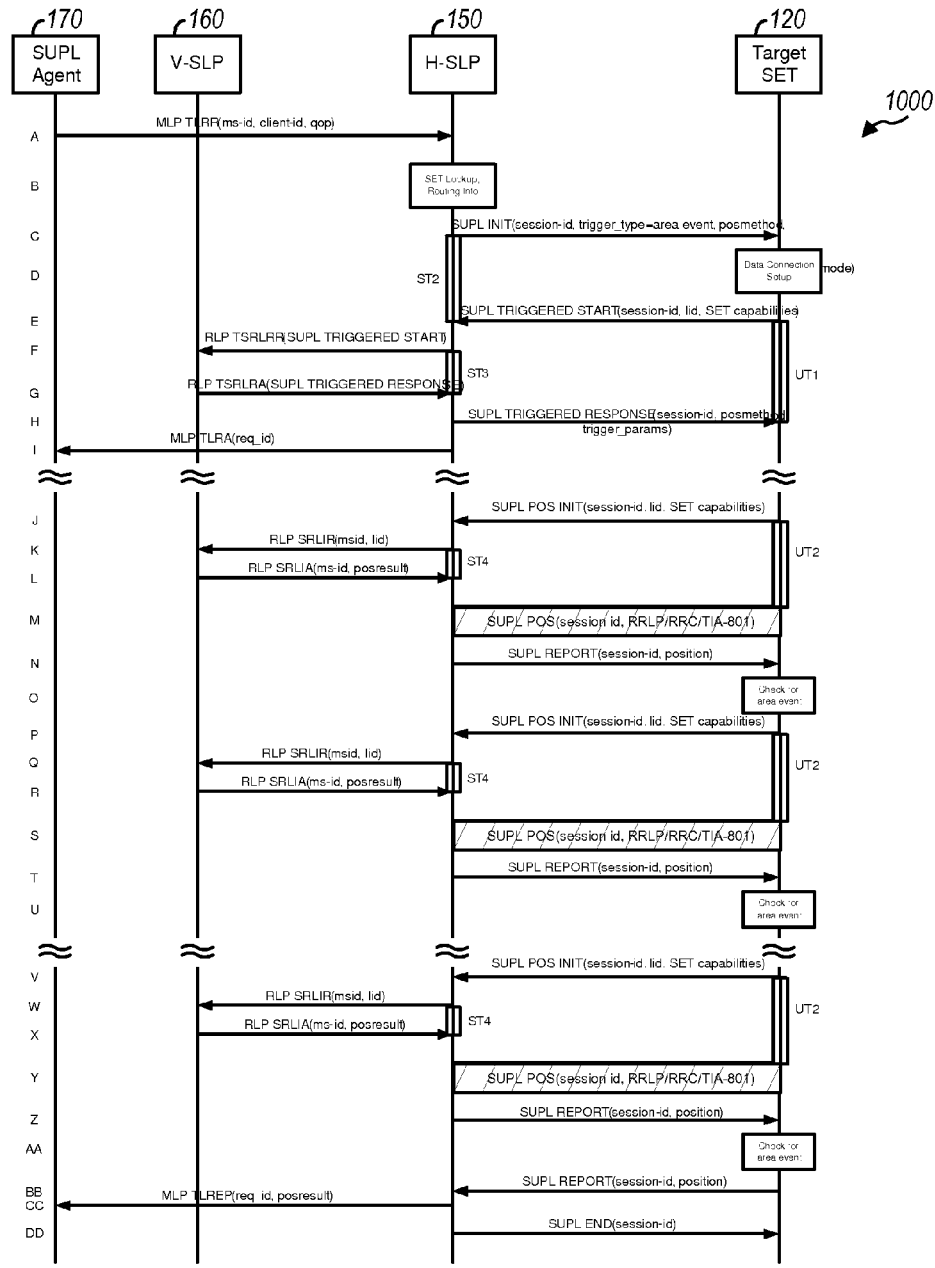

FIG. 10 shows an embodiment of a message flow 1000 for network initiated area event triggered service for roaming with H-SLP positioning in proxy mode. Steps A through I of message flow 1000 are similar to steps A through I of message flow 500 in FIG. 5, except that area event triggered service (instead of periodic triggered service) is requested in steps A and C. H-SLP 150 may include a definition of the event area in the SUPL TRIGGERED RESPONSE message sent to SET 120 in step H.

For the first position estimate indicated by the area event trigger mechanism in SET 120, steps J to M are performed in similar manner as steps J through M in message flow 500. If the position estimate is calculated in H-SLP 150 or V-SLP 160, then H-SLP 150 sends the position estimate in a SUPL REPORT message to SET 120 (step N). SET 120 compares the position estimate with the event area and determines if an event trigger condition has been met (step O). Steps J to N are repeated whenever the area event trigger mechanism in SET 120 indicates a new position estimate should be obtained. When the area event is triggered in step AA, SET 120 sends a SUPL REPORT message containing the session ID and the position estimate to H-SLP 150 (step BB). H-SLP 150 forwards the position estimate to SUPL agent 170 (step CC) and ends the area event triggered session by sending a SUPL END message to SET 120 (step DD).

Figure 11:
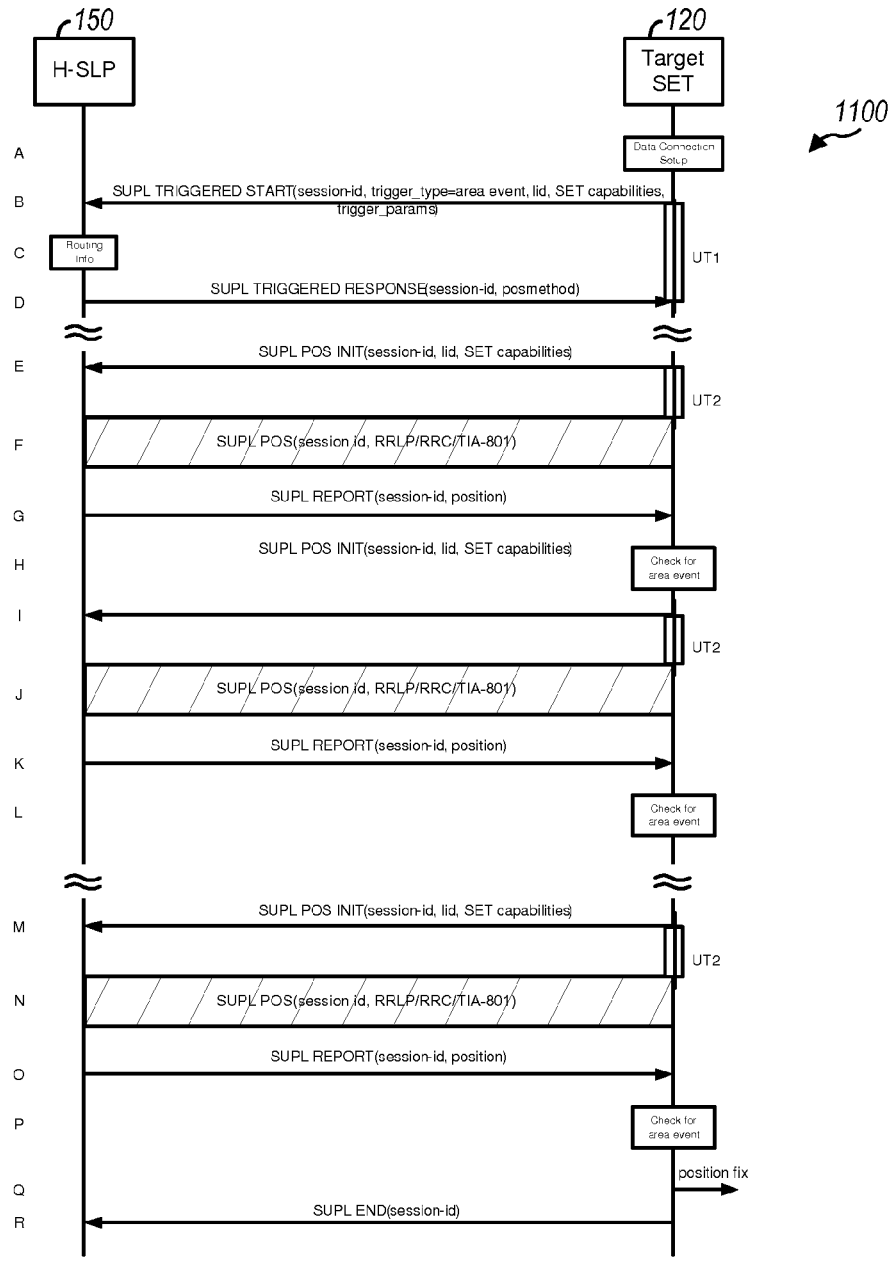

FIG. 11 shows an embodiment of a message flow 1100 for SET initiated area event triggered service for non-roaming in proxy mode. Steps A through D of message flow 1100 are similar to steps A through D of message flow 600 in FIG. 6, except that area event triggered service (instead of periodic triggered service) is requested in step B.

For the first position estimate indicated by the area event trigger mechanism in SET 120, steps E to G are performed in similar manner as steps E through G in message flow 600. SET 120 compares the position estimate with the event area and determines if an event trigger condition has been met (step H). Steps E to H are repeated whenever the area event trigger mechanism in SET 120 indicates a new position estimate should be obtained. When the area event is triggered in step P, SET 120 forwards the position estimate to SUPL agent 122 within SET 120 (as shown in FIGS. 1A and 1B) (step Q). SET 120 ends the area event triggered session by sending a SUPL END message to H-SLP 150 (step R).

Figure 12:
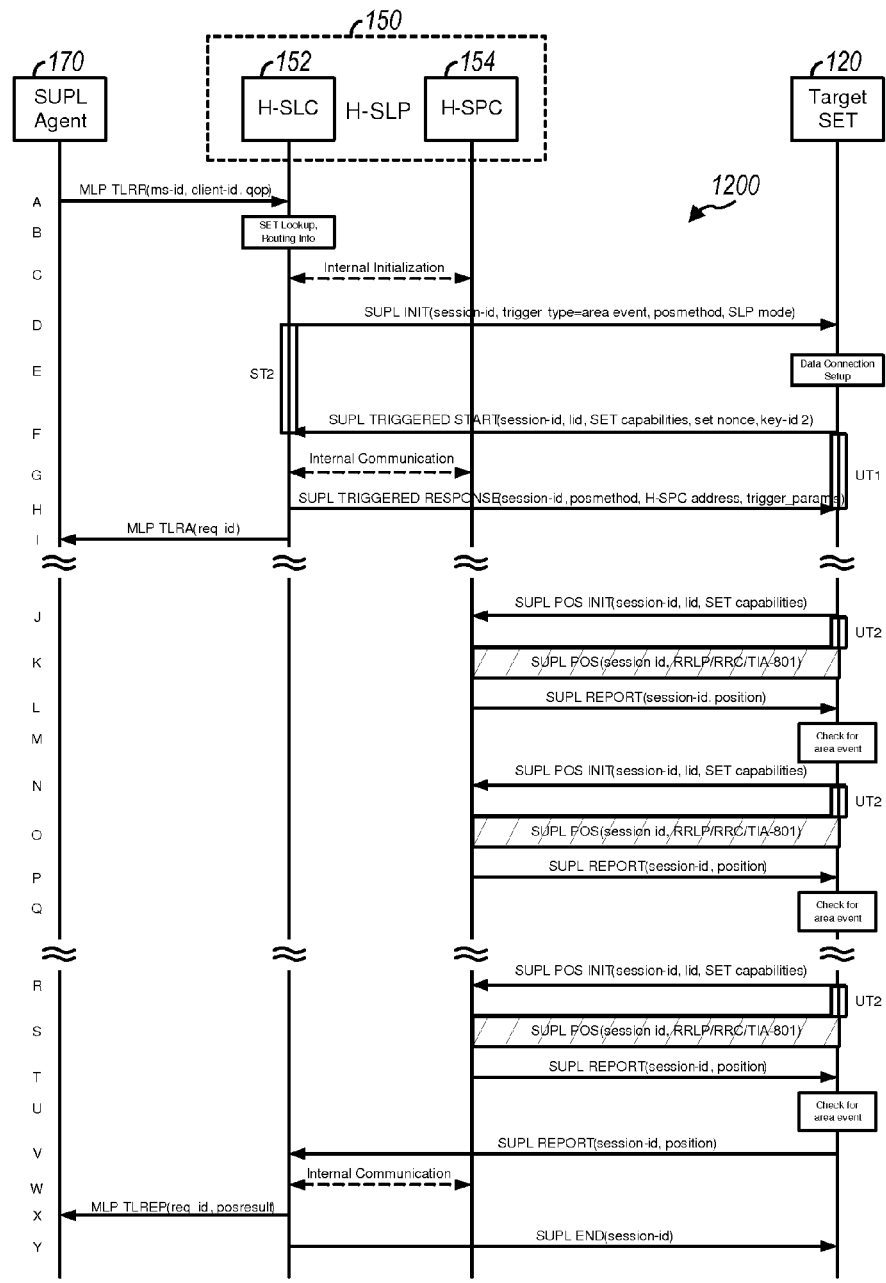

FIG. 12 shows an embodiment of a message flow 1200 for network initiated area event triggered service for non-roaming in non-proxy mode. Steps A through I of message flow 1200 are similar to steps A through I of message flow 700 in FIG. 7, except that area event triggered service (instead of periodic triggered service) is requested in steps A and D. H-SLP 150 may include a definition of the event area in the SUPL TRIGGERED RESPONSE message sent to SET 120 in step H.

For the first position estimate indicated by the area event trigger mechanism in SET 120, steps J and K are performed in similar manner as steps J and K in message flow 700. If the position estimate is calculated in H-SPC 154, then the H-SPC sends the position estimate in a SUPL REPORT message to SET 120 (step L). SET 120 compares the position estimate with the event area and determines if an event trigger condition has been met (step M). Steps J to M are repeated whenever the area event trigger mechanism in SET 120 indicates a new position estimate should be obtained. When the area event is triggered in step U, SET 120 sends a SUPL REPORT message containing the position estimate to H-SLC 152 (step V). H-SLC 152 informs H-SPC 154 of the end of the area event triggered session through internal communication (step W). H-SLC 152 sends the position estimate in a MLP TLREP message to SUPL agent 170 (step X) and ends the area event triggered session by sending a SUPL END message to SET 120 (step Y).

Historical triggered service may be similar to periodic triggered service in that measurements and/or a position estimate may be obtained periodically or when certain trigger events occur for a target SET. However, the measurements and/or position estimate may or may not be reported immediately for historical triggered service. If the SET stores and later sends historic measurements, rather than historic position estimates, then the V-SLP, H-SLP, or SPC may convert the measurements into historic position estimates to send to the SUPL agent. Table 6 lists some reporting modes for historical triggered service. Different services may have different requirements and may use different reporting modes.

TABLE 6

| Reporting Mode | Description |
| --- | --- |
| Real time | Measurements and/or position estimates are provided in real time. |
| Quasi-real time | Real-time measurements and/or position estimates are preferred but historical measurements and/or position estimates are also accepted. |
| Batch | Historical measurements and/or position estimates are provided, e.g., in a batch. |

Figure 13:
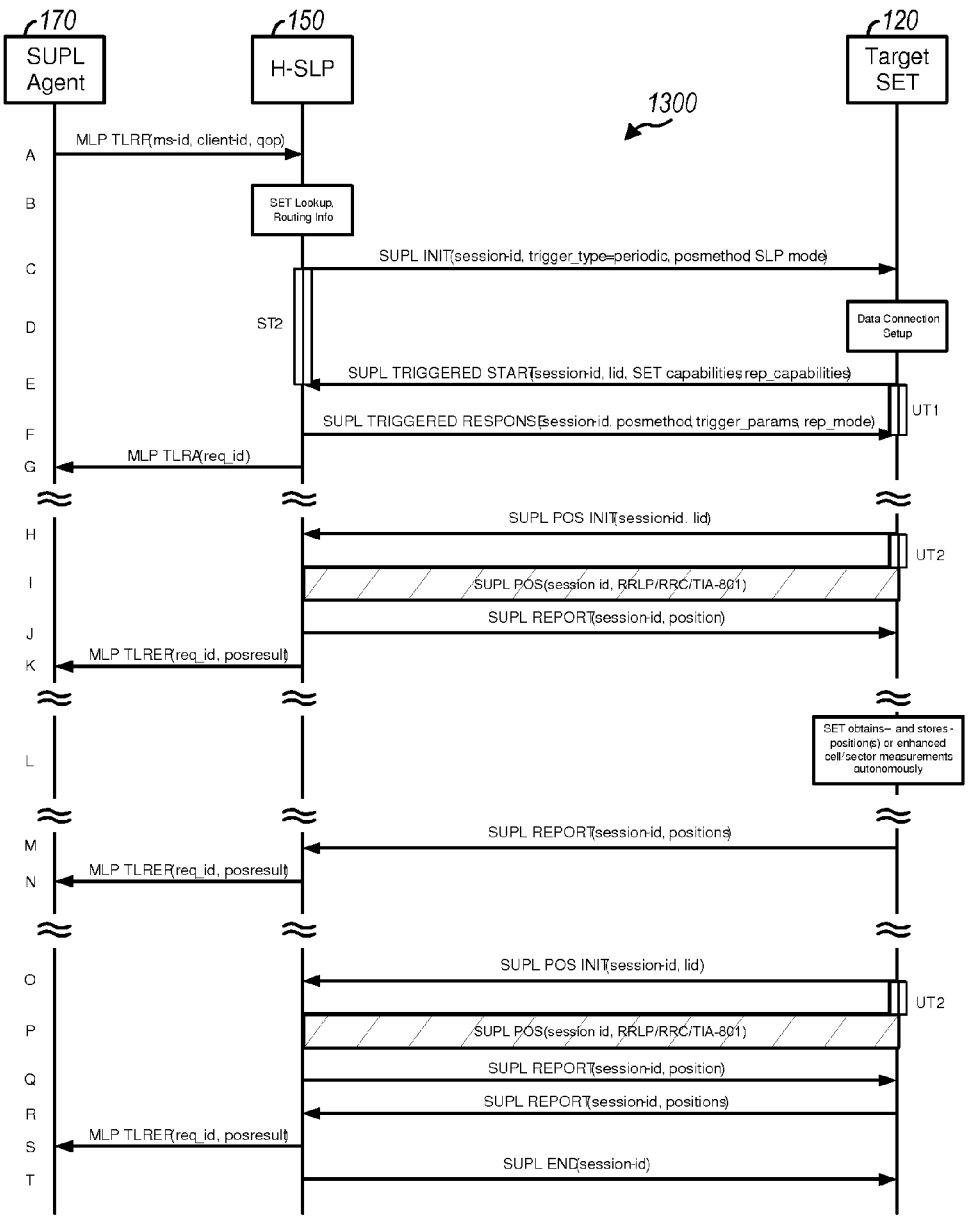

FIG. 13 shows an embodiment of a message flow 1300 for network initiated historical triggered service for non-roaming in non-proxy mode. Steps A through G of message flow 1300 are similar to steps A through G of message flow 200 in FIG. 2, except for the following. Historical triggered service is requested in steps A and C. The MLP TLRR message sent by SUPL agent 170 in step A may indicate what mode of reporting (batch, real time, or quasi-real time) is expected of target SET 120. In the case of batch reporting, the TLRR message may indicate the conditions for sending batch reports to H-SLP 150 and any criteria (e.g., QoP, time window) for including or excluding historical measurements and/or position estimates stored at SET 120. SET 120 sends its reporting capabilities (rep_capabilities), which indicates whether real time, quasi-real time, and/or batch reporting are supported, in step E. SET 120 may always send its reporting capabilities in a SUPL TRIGGERED START message or may only send its reporting capabilities in response to receiving a historical triggered service request in step C. H-SLP 150 selects a reporting mode (rep_mode) consistent with the SET reporting capabilities and sends the selected reporting mode in step F. For batch reporting, H-SLP 150 also provides the conditions for sending batch reports to H-SLP 150 and any criteria for including or excluding historical measurements and/or position estimates (e.g., QoP, time window) in step F. For batch or quasi-real time reporting, the SUPL_TRIGGERED RESPONSE message in step F may indicate if SET 120 is permitted to send historic measurements. In this case, if batch reporting was selected, then SET 120 may skip steps H, I and J.

For the first event indicated by a periodic trigger mechanism in SET 120, steps H and I may be performed in similar manner as steps H and I in message flow 200. If a position estimate is calculated in H-SLP 150 and batch reporting is selected, then the H-SLP sends the position estimate in a SUPL REPORT message to SET 120 (step J). If real-time or quasi-real time reporting is selected, then H-SLP 150 forwards the position estimate in an MLP TLREP message to SUPL agent 170 (step K). For a given event, if SET 120 cannot communicate with H-SLP 150 (e.g., because of out of cellular coverage) and if batch or quasi-real time reporting is selected, then the SET may calculate and store a position estimate autonomously, e.g., for autonomous GPS or A-GPS SET based modes where the SET has current assistance data (step L). SET 120 may also store measurements in step L if allowed by H-SLP 150 in step F, provided that either batch reporting was selected by H-SLP 150 in step F or quasi-real time reporting was selected in step F and SET 120 cannot communicate with H-SLP 150.

SET 120 may send a SUPL REPORT message containing historical result(s) when appropriate (step M). For example, step M may be performed if (1) batch reporting is selected and the conditions for sending batch reports are met or (2) quasi-real time reporting is selected and SET 120 re-establishes communication with H-SLP 150 after missing one or more previous reports. For batch reporting, the SUPL REPORT message may include (1) stored measurements and/or position estimates selected based on the criteria received in step F or (2) all stored measurements and/or position estimates not previously reported, if no criteria are received in step F. H-SLP 150 may compute position estimate(s) if measurements are obtained from SET 120. H-SLP 150 forwards the reported or computed position estimate(s) in an MLP TLREP message to SUPL agent 170 (step N).

Steps H to J or step L may be performed for each subsequent event indicated by the periodic trigger mechanism. After the last measurements and/or position estimate have been obtained or was due, SET 120 may send a SUPL REPORT message containing all stored measurements and/or position estimates to H-SLP 150 (step R). This message may also be sent if (1) batch or quasi-real time reporting is used, (2) SET 120 has stored measurements and/or position estimates that have not yet been sent to the H-SLP, (3) SET 120 is able to establish communication with H-SLP 150, (4) batch reporting is used and the conditions for sending have arisen (e.g., the conditions define sending after the last measurements and/or position estimate are obtained). H-SLP 150 may compute position estimate(s) based on received measurements, if necessary, and forwards the position estimate(s) in an MLP TLREP message to SUPL agent 170 (step S). H-SLP 150 may also retain the historical position estimate(s) for later retrieval by SUPL agent 170. H-SLP 150 ends the historical triggered session by sending a SUPL END message to SET 120 (step T).

Figure 14:
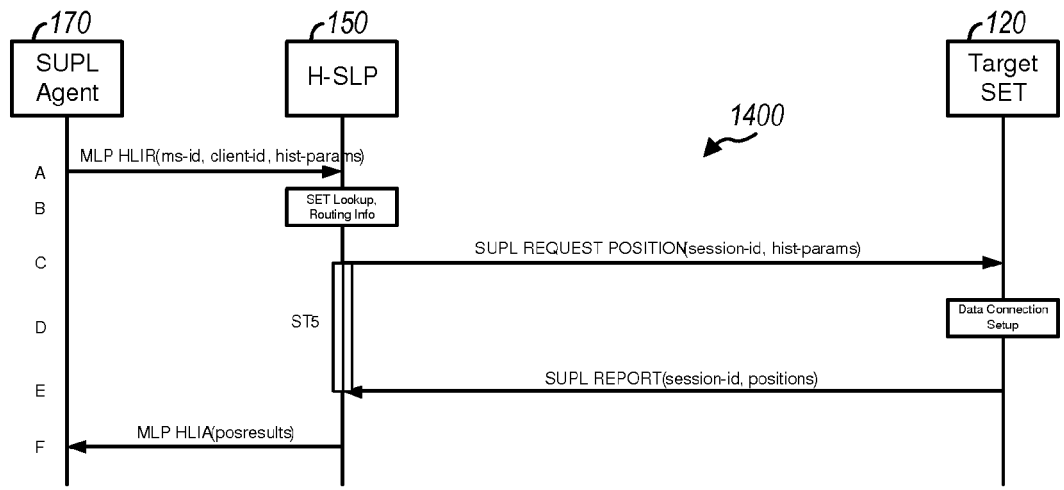

FIG. 14 shows an embodiment of a message flow 1400 for retrieval of historical measurements and/or position results for non-roaming in non-proxy mode. SUPL agent 170 sends an MLP Historical Location Immediate Request (HLIR) message to H-SLP 150 (step A). This message may include parameters/criteria (hist-params) (e.g., time window, QoP, positioning method, and so on) to be applied by SET 120 when selecting historical measurements and/or position estimates to return to SUPL agent 170. H-SLP 150 authenticates SUPL agent 170, checks if the SUPL agent is authorized for the requested service, and applies subscriber privacy. H-SLP 150 obtains routing information for SET 120 and uses the routing information to send messages to the SET (also step B). H-SLP 150 then initiates retrieval of historical measurements and/or position estimates with SET 120 by sending a SUPL REQUEST POSITION message (step C). This message may include the session ID, the criteria for selecting historical measurements and/or position estimates, and/or other information.

SET 120 establishes a secure IP connection with H-SLP 150 (step D). SET 120 selects historical measurements and/or position estimates based on the received criteria and sends position results in a SUPL REPORT message to H-SLP 150 (step E). H-SLP 150 converts any historic measurements received in step E into corresponding position estimates. H-SLP forwards the position estimates in an MLP Historical Location Immediate Answer (HLIA) message to SUPL agent 170 (step F).

Figure 15:
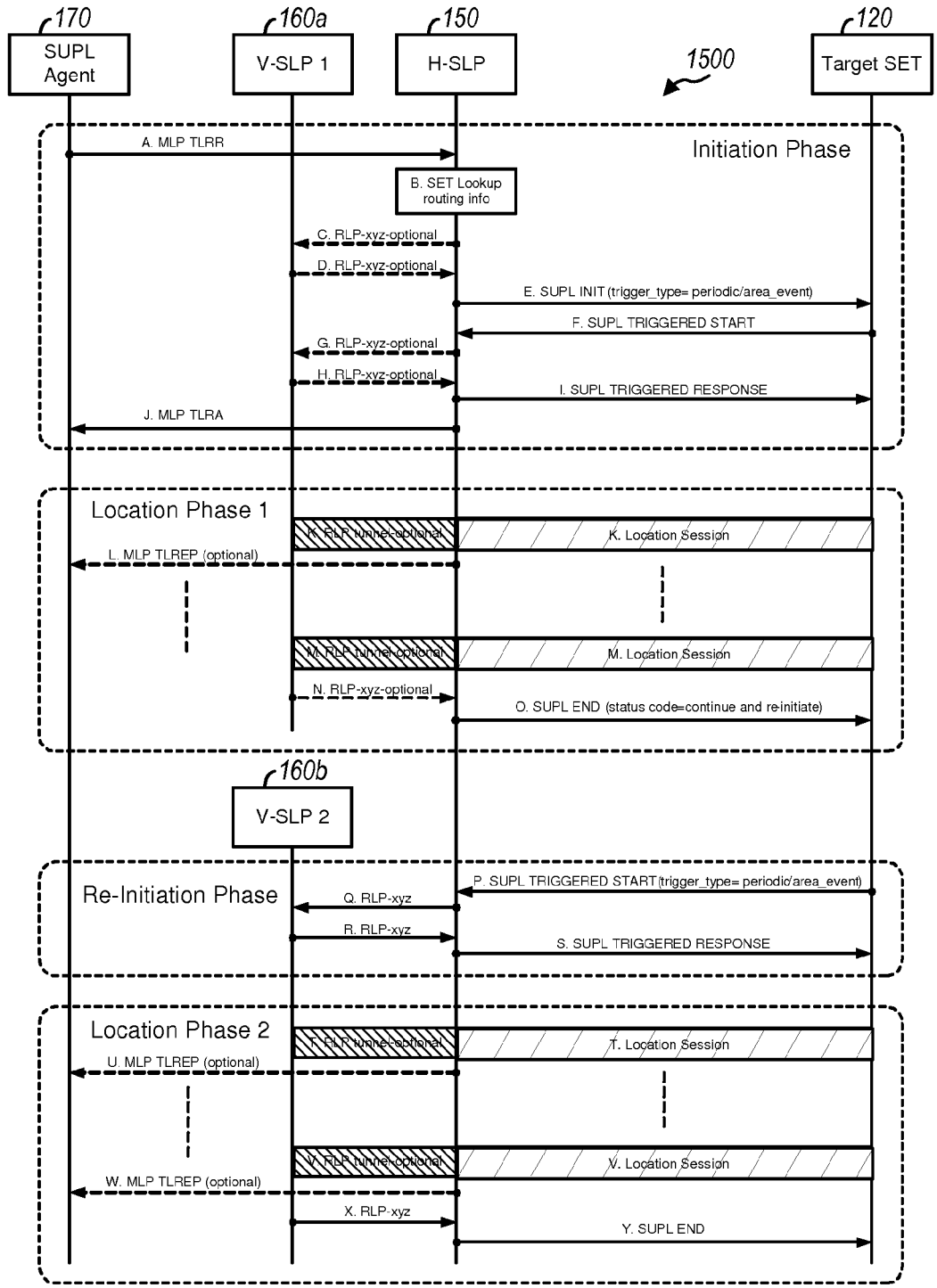

FIG. 15 shows an embodiment of a message flow 1500 for network initiated period or area event triggered service for roaming in proxy mode. For roaming scenarios, a triggered session may be started in one SLP and may move to a new SLP during the session. The triggered session may move from an H-SLP to a V-SLP, from one V-SLP to another V-SLP, or from a V-SLP to an H-SLP. Message flow 1500 includes an initiation/setup phase, a first location phase, a re-initiation phase, and a second location phase. Steps C, D, G, H and N with dotted lines may be performed when the triggered session starts in a visited network and may be omitted if the triggered session starts in the home network.

In the initiation phase, SUPL agent 170 sends an MLP TLRR message to H-SLP 150. This message may include periodic or area event trigged information, QoP, client ID, and/or other information. H-SLP 150 determines a V-SLP 160a in a visited network to which SET 120 has roamed and also determines that SET 120 supports triggered service (step B). H-SLP 150 contacts V-SLP 160a to request service and to determine positioning method(s) proposed by V-SLP 160a (step C). V-SLP 160a responds by sending the proposed positioning method(s) to H-SLP 150 (step D). H-SLP 150 sends a SUPL INIT message to SET 120 using SMS, WAP push, or UDP/IP (step E). This message may include the proposed positioning method(s), notification and verification information, QoP, service type (e.g., periodic or area event) and/or other information.

SET 120 performs notification and verification if required. If SET 120 supports triggered service and one of the proposed positioning method(s) and if the user grants permission when requested, then SET 120 establishes a secure IP connection to H-SLP 150 and sends a SUPL TRIGGERED START message to H-SLP 150. This message may include the SET capabilities, the SET location (e.g., approximate coordinates or location ID), and/or other information (step F). H-SLP 150 forwards the SUPL TRIGGERED START message to V-SLP 160a (step G). V-SLP 160a responds with a SUPL TRIGGERED RESPONSE message (step H), which H-SLP 150 forwards to SET 120 (step I). This message may include the positioning method selected for the triggered session, the trigger parameters for periodic or area event, and so on. H-SLP 150 and SET 120 store the selected positioning method. SET 120 and/or H-SLP 150 may release the IP connection, e.g., after some timeout or inactivity. H-SLP 150 returns an MLP TLRA message to SUPL agent 170 to indicate that the triggered service request has been accepted.

In the first location phase, SET 120 engages in a location session with H-SLP 150 for the first position estimate (step K). A suitable message flow may be used for the location session depending on the selected positioning method and the trigger type (e.g., periodic or area event). For proxy mode with V-SLP, H-SLP 150 may tunnel the location session via RLP to V-SLP 160a. For proxy mode with H-SLP, H-SLP 150 may receive a location ID in a SUPL POS INIT message and may send this information via RLP to V-SLP 160*a* in order to obtain an initial coarse position. H-SLP 150 and SET 120 may conduct the location session. For periodic reporting or when an area event trigger was occurred, H-SLP 150 may send a position estimate in an MLP TLREP message to SUPL agent 170 (step L). Steps K and L may be repeated any number of times for the triggered session. When SET 120 tries to engage in a location session in step M, the location session fails because SET 120 has left the coverage area of V-SLP 160*a* (or H-SLP 150 if the triggered session started in the home network). V-SLP 160*a* may send a SUPL END message with a status code "continue and re-initiate" to H-SLP 150 (step N), which forwards the message to SET 120 (step O). This message notifies SET 120 of the failed location session.

In the re-initiation phase, which takes place whenever SET 120 roams outside the coverage area of a V-SLP or an H-SLP, SET 120 sends a SUPL TRIGGERED START message to H-SLP 150 to restart the triggered session (step P). This message may include a location ID and updated trigger parameters, e.g., the remaining number of position estimates for periodic trigger service or a new duration for area event trigger service. H-SLP 150 determines a new V-SLP 160*b* based on the location ID and forwards the SUPL TRIGGERED START message to V-SLP 160*b* (step Q). V-SLP 160*b* selects a positioning method and returns a SUPL TRIGGERED RESPONSE message to H-SLP 150 (step R), which forwards the message to SET 120 (step S). The re-initiation mechanism in FIG. 15 may also be used for SET initiated triggered location service.

In the second location phase, SET 120 resumes the triggered session with V-SLP 160*b* until it reaches the end (steps T through Y).

Figure 16:
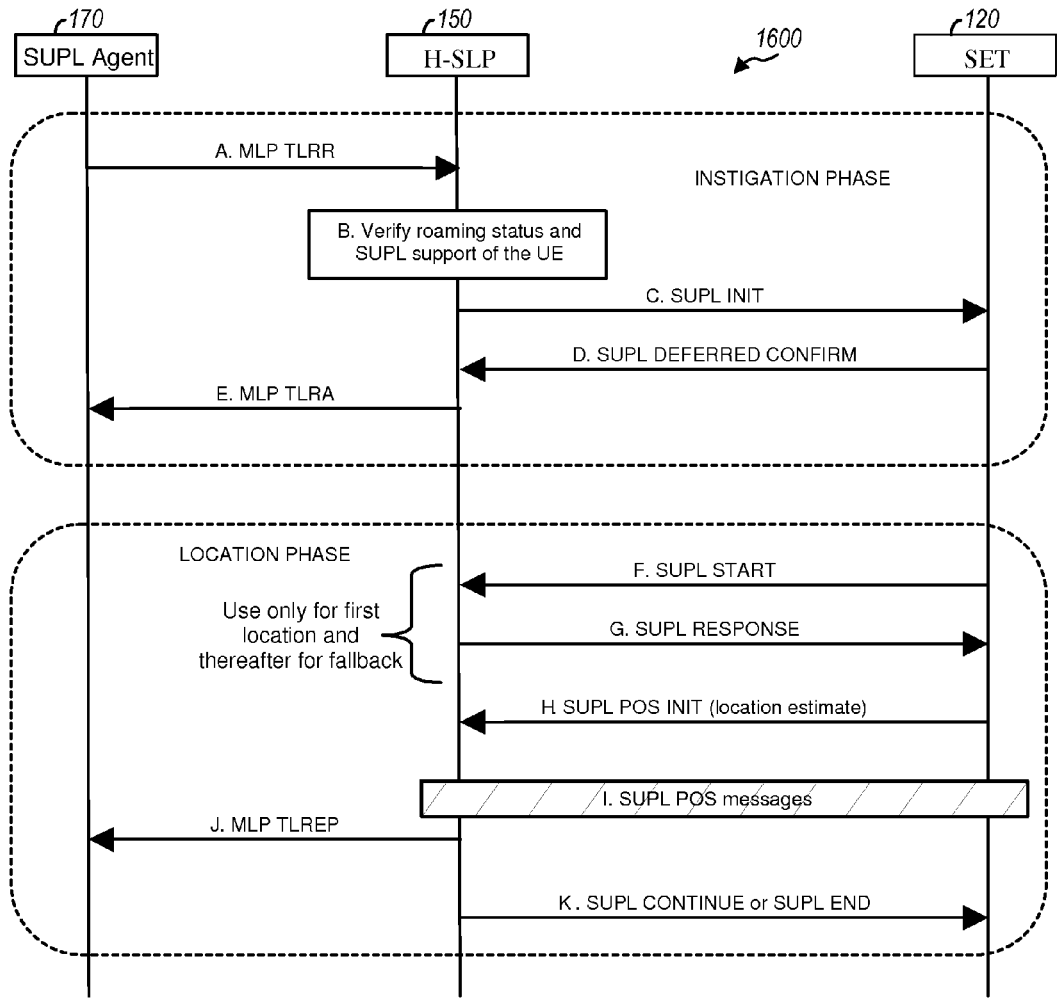

FIG. 16 shows an embodiment of a message flow 1600 for network initiated periodic triggered service for non-roaming in proxy mode. Message flow 1600 may be used in place of message flow 200 in FIG. 2 or message flow 800 in FIG. 8. Message flow 1600 includes an instigation/setup phase and a location phase.

In the instigation phase, SUPL agent 170 sends to H-SLP 150 an MLP TLRR message that may include periodic, area event, historical or deferred location information, QoP, client ID, and/or other information (step A). H-SLP 150 verifies that SET 120 is not roaming and supports SUPL (step B). H-SLP 150 sends a SUPL INIT message to SET 120, e.g., using SMS, WAP push, or UDP/IP (step C). This message may include a session ID, a trigger type indicator (e.g., periodic, area event, historical or deferred), a proxy/non-proxy mode indicator, a proposed positioning method, QoP, notification and verification information, and/or other information. SET 120 may notify the user of the location request and, if required, obtain the user's permission. If SET 120 supports the proposed positioning method and if user permission is obtained as needed, then SET 120 establishes a secure IP connection to H-SLP 150 and sends a SUPL DEFERRED CONFIRM message to H-SLP 150 (step D). This message may include the SET capabilities, the SET location, and so on. Negotiation of a positioning method to use may be deferred until the location phase to simplify the instigation phase. H-SLP 150 sends an MLP TLRA message to SUPL agent 170 to indicate that the triggered service request has been accepted (step E).

In the location phase, when the first position estimate is triggered, SET 120 sends a SUPL START message that may include the session ID, a location ID, a trigger event (e.g., periodic interval expiration), and so on (step F). H-SLP 150 returns a SUPL RESPONSE message (step G). Steps F and G may be performed for the first position estimate and may be omitted for remaining position estimates. SET 120 then sends a SUPL POS INIT message to H-SLP 150 (step H). This message may include a position estimate for SET 120 if a SET based positioning mode is selected. SET 120 and H-SLP 150 may engage in a SUPL POS session and obtain a position estimate for the SET (step I). H-SLP 150 sends the position estimate in an MLP TLREP message to SUPL agent 170 (step J). H-SLP 150 (or H-SPC, V-SLP, or V-SPC) may send a SUPL CONTINUE message to confirm that the current location attempt is complete (step K) and may indicate if SET 120 should fallback to the complete location procedure starting at step F for the next location attempt or may start the next location attempt at step H. For example, fallback to step F may be used if SET 120 has left the coverage area of H-SLP 150 and H-SLP 150 needs to request usage of a V-SLP. H-SLP 150 may also send a SUPL END message to end the triggered session (step K).

Figure 17:
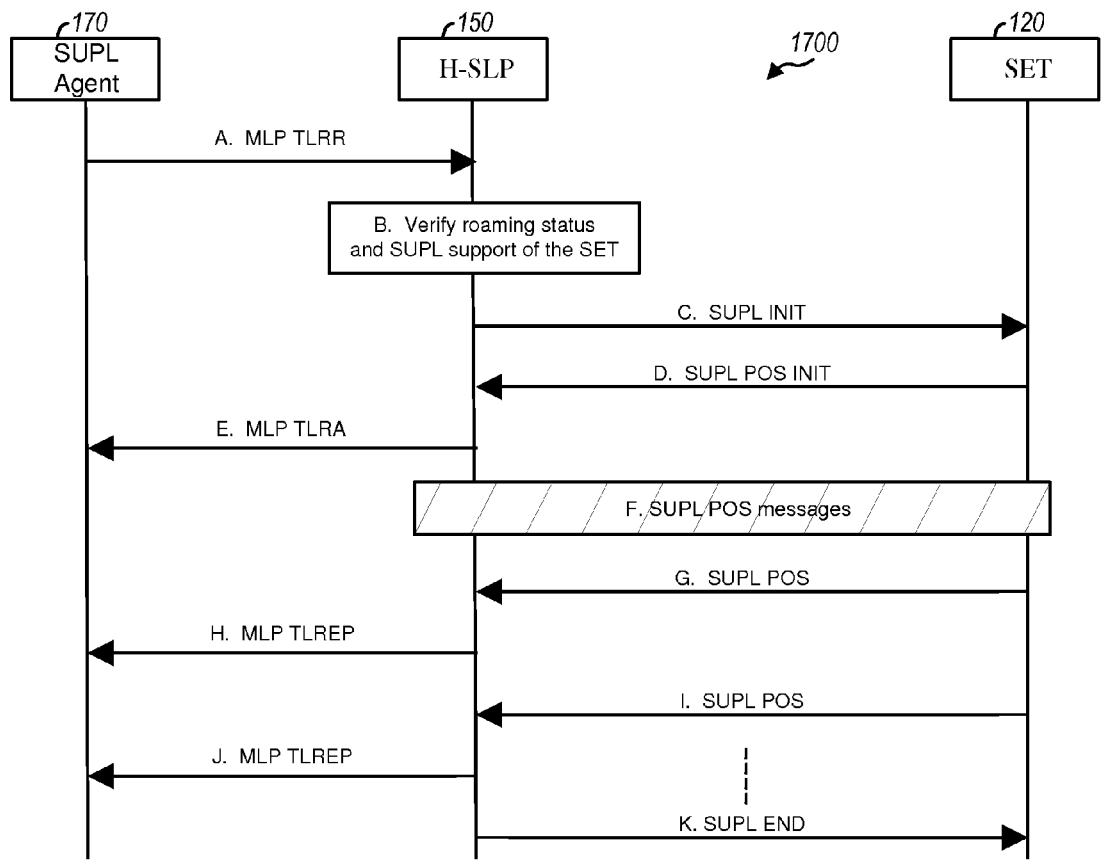

FIG. 17 shows an embodiment of a message flow 1700 for network initiated periodic triggered service for non-roaming in proxy mode. Message flow 1700 may also be used in place of message flow 200 in FIG. 2, message flow 800 in FIG. 8, or message flow 1600 in FIG. 16.

Steps A, B, C and E may be performed as described above for steps A, B, C and G, respectively, in FIG. 2. SET 120 performs notification and verification if required, establishes a secure IP connection to H-SLP 150, and sends a SUPL POS INIT message to H-SLP 150 (step D). This message may include the SET capabilities, request for assistance data, a position estimate, and so on. H-SLP 150 and SET 120 may exchange SUPL POS messages to provide any requested assistance data, positioning method instructions, QoP, periodic location information, and so on (step F).

When the first position estimate is due, SET 120 obtains measurements or a position estimate in accordance with the selected positioning method and sends the information in a SUPL POS message (step G). H-SLP 150 may compute a position estimate based on measurements received from SET 120 or may verify a position estimate received from SET 120. H-SLP 150 then forwards the position estimate in an MLP TLREP message to SUPL agent 170 (step H). Steps G and H may be repeated (e.g., in steps I and J) whenever another position estimate is due. H-SLP 150 may send a SUPL END message to SET 120 to terminate the periodic triggered service, e.g., after sending the final position estimate to SUPL agent 170 (step K). SET 120 may also send a SUPL END message to end the periodic triggered service (not shown).

Figure 18:
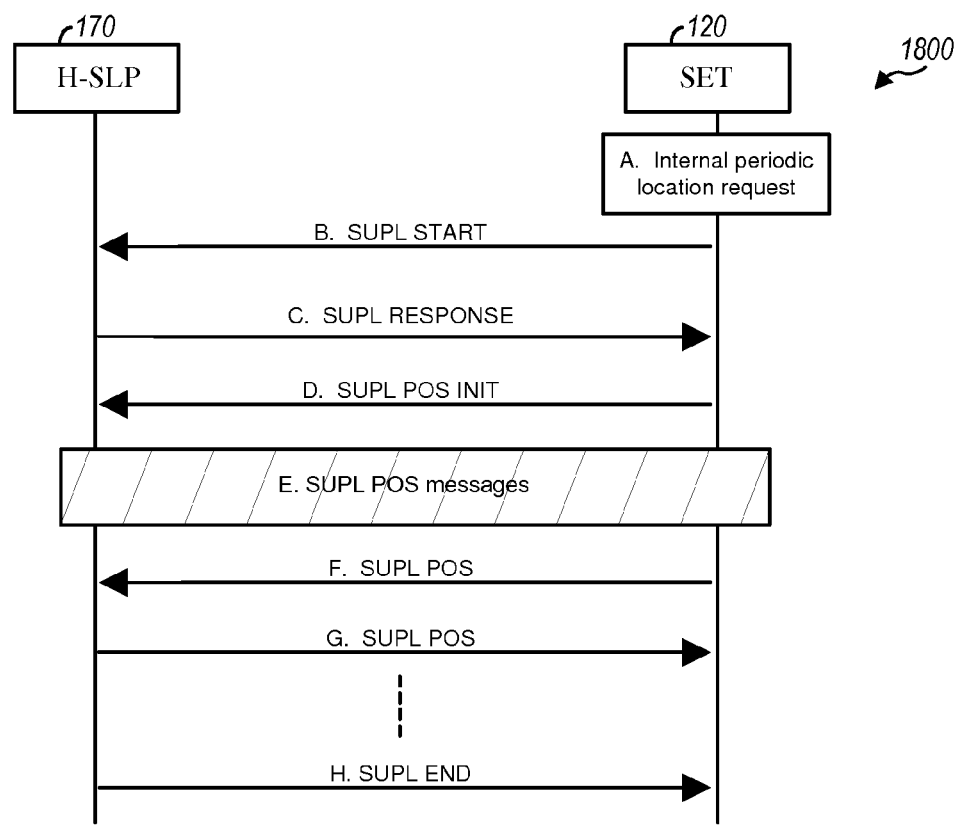

FIG. 18 shows an embodiment of a message flow 1800 for SET initiated periodic triggered service for non-roaming in proxy mode. Message flow 1800 may be used in place of message flow 600 in FIG. 6, or message flow 1100 in FIG. 11.

SET 120 receives a request for periodic position estimates from an internal LCS client or from an external LCS client linked to an internal application (step A). SET 120 may perform notification and authorization if needed. SET 120 then establishes a secure IP connection to H-SLP 150 and sends a SUPL START message that may include a request for periodic self location, SET capabilities, a position estimate, QoP, and so on (step B). H-SLP 150 proposes or selects a positioning method based on the SET capabilities and sends a SUPL RESPONSE message to SET 120 (step C). SET 120 sends to H-SLP 150 a SUPL POS INIT message containing the UE capabilities, a request for assistance data, and so on (step D). H-SLP 150 selects a positioning method based on the H-SLP proposal in step C and the SET capabilities provided in steps B and/or D. H-SLP 150 and SET 120 may then exchange SUPL POS messages to provide any requested assistance data, positioning method instructions, QoP, periodic location information, and so on (step E).

When the first position estimate is due, SET 120 may obtain measurements in accordance with the selected positioning method and send the measurements and/or request for assistance data in a SUPL POS message (step F). H-SLP 150 may compute a position estimate based on measurements received from SET 120 and return the position estimate and/or assistance data in a SUPL POS message (step G). Steps F and G may be repeated whenever another position estimate is due. H-SLP 150 may send a SUPL END message to SET 120 to terminate the periodic triggered service (step H) or SET 120 may send the SUPL END message.

Figure 19:
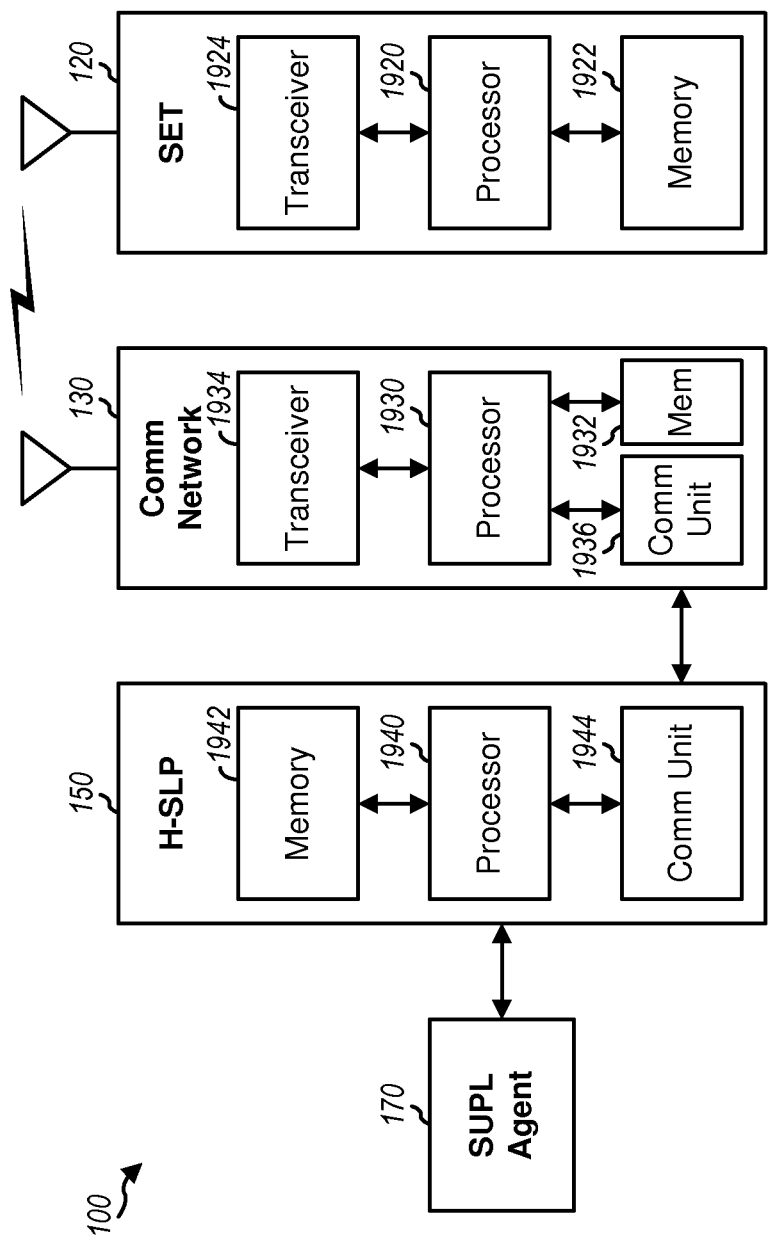
FIG. 19 shows a block diagram various entities in FIGS. 1A and 1B.

FIG. 19 shows a block diagram an embodiment of SET 120, H-SLP 150, and communication network 130 in network architectures 100 and 102 in FIGS. 1A and 1B. Communication network 130 provides communication for terminals and may include base stations (or Node Bs) and network controllers. For simplicity, FIG. 19 shows only one processor 1920, one memory unit 1922, and one transceiver 1924 for SET 120, only one processor 1930, one memory unit 1932, one transceiver 1934, and one communication (Comm) unit 1936 for network 130, and only one processor 1940, one memory unit 1942, and one transceiver 1944 for H-SLP 150. In general, each entity may include any number of processors, memory units, transceivers, communication units, controllers, and so on. SET 120 may support wireless communication and may also receive and process GPS signals.

On the downlink, base stations in network 130 transmit traffic data, signaling, and pilot to terminals within their coverage area. These various types of data are processed by processor 1930 and conditioned by transceiver 1934 to generate a downlink signal, which is transmitted via an antenna. At SET 120, the downlink signals from one or more base stations are received via an antenna, conditioned by transceiver 1924, and processed by processor 1920 to obtain various types of information for location services. For example, processor 1920 may decode messages used for the message flows described above. Memory units 1922 and 1932 store program codes and data for SET 120 and network 130, respectively. On the uplink, SET 120 may transmit traffic data, signaling, and pilot to one or more base stations in network 130. These various types of data are processed by processor 1920 and conditioned by transceiver 1924 to generate an uplink signal, which is transmitted via the SET antenna. At network 130, the uplink signals from SET 120 and other terminals are received and conditioned by transceiver 1934 and further processed by processor 1930 to obtain various types of information (e.g., data, signaling, reports, and so on). Network 130 communicates with H-SLP 150 and other network entities via communication unit 1936.

Within H-SLP 150, processor 1940 performs processing for the H-SLP, memory unit 1942 stores program codes and data for the H-SLP, and communication unit 1944 allows the H-SLP to communicate with network 130 and other network entities. Processor 1940 may perform processing for H-SLP 150 for the message flows described above.

The techniques described herein may be implemented by various means. For example, the techniques may be implemented in hardware, firmware, software, or a combination thereof. For a hardware implementation, the units used to perform the processing at each entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software and/or firmware implementation, the techniques may be implemented with modules (e.g., procedures, functions, and so on) that perform the functions described herein. The software codes may be stored in a memory unit (e.g., memory unit 1922, 1932 or 1942 in FIG. 19) and executed by a processor (e.g., processor 1920, 1930 or 1940). The memory unit may be implemented within the processor or external to the processor.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A Secure User Plane Location (SUPL) enabled terminal (SET) comprising:
at least one processor configured to:
receive a first message from a Home SUPL Location Platform (H-SLP) to initiate a triggered location session, the first message including a trigger type and a positioning method requested by the H-SLP, wherein the trigger type is an area event;
determine whether the SET can support the positioning method requested by the H-SLP;
transmit a second message to the H-SLP to start the triggered location session in response to the first message, wherein the second message includes an indication whether the SET can support the positioning method requested by the H-SLP;
receive a third message in response to the second message, the third message including an area event trigger for the area event;
determine at least one position estimate for the SET in response to the area event trigger being satisfied;
report the at least one position estimate for the SET to the H-SLP.

2. The Secure User Plane Location enabled terminal of claim 1, wherein the at least one processor is configured to select a positioning method from among a plurality of positioning methods supported by the SET, and wherein the at least one position estimate is determined in accordance with the selected positioning method.

3. The Secure User Plane Location enabled terminal of claim 1, wherein the at least one processor is configured to determine the at least one position estimate for the SET in response to occurrence of the area event and in response to a standalone positioning method being selected.

4. The Secure User Plane Location enabled terminal of claim 1, wherein the at least one processor is configured to determine the at least one position estimate for the SET in response to occurrence of the area event and in response to a SET based positioning method being selected.

5. The Secure User Plane Location enabled terminal of claim 1, wherein the first message is a SUPL initiate message, the second message is a SUPL triggered start message, and the third message is a SUPL triggered response message.

6. The Secure User Plane Location enabled terminal of claim 1, wherein the area event trigger comprises the SET entering a predefined geographic area.

7. The Secure User Plane Location enabled terminal of claim 1, wherein the area event trigger comprises the SET leaving a predefined geographic area.

8. The Secure User Plane Location enabled terminal of claim 1, wherein the area event trigger comprises the SET remaining within a predefined geographic area.

9. The Secure User Plane Location enabled terminal of claim 1, wherein the third message comprises a reporting mode indicator.

10. A method performed by a Secure User Plane Location enabled terminal (SET) comprising:
receiving a first message from a Home SUPL Location Platform (H-SLP) for initiating a triggered location session, the first message including a trigger type and a positioning method requested by the H-SLP, wherein the trigger type is an area event;
determining whether the SET can support the positioning method requested by the H-SLP;
transmitting a second message to the H-SLP to start the triggered location session in response to the first message, wherein the second message includes an indication whether the SET can support the positioning method requested by the H-SLP;
receiving a third message in response to the second message, the third message including an area event trigger for the area event;
determining at least one position estimate for the SET in response to the area event trigger being satisfied; and
reporting the at least one position estimate for the SET to the H-SLP.

11. The method of claim 10, further comprising:
selecting a positioning method from among a plurality of positioning methods supported by the SET, and wherein the at least one position estimate is determined in accordance with the selected positioning method.

12. The method of claim 10, further comprising:
deriving the at least one position estimate for the SET in response to occurrence of the area event and in response to a standalone positioning method being selected.

13. The method of claim 10, further comprising:
deriving the at least one position estimate for the SET in response to occurrence of the area event and in response to a SET based positioning method being selected.

14. The method of claim 10, wherein the first message is a SUPL initiate message, the second message is a SUPL triggered start message, and the third message is a SUPL triggered response message.

15. The method of claim 10, wherein the area event trigger comprises the SET entering a predefined geographic area.

16. The method of claim 10, wherein the area event trigger comprises the SET leaving a predefined geographic area.

17. The method of claim 10, wherein the area event trigger comprises the SET remaining within a predefined geographic area.

18. The method of claim 10, wherein the third message comprises a reporting mode.

19. A Secure User Plane Location enabled terminal (SET) comprising:
means for receiving a first message from a Home SUPL Location Platform (H-SLP) for initiating a triggered location session, the first message including a trigger type and a positioning method requested by the H-SLP, wherein the trigger type is an area event;
means for determining whether the SET can support the positioning method requested by the H-SLP;
means for transmitting a second message to the H-SLP to start the triggered location session in response to the first message, wherein the second message includes an indication whether the SET can support the positioning method requested by the H-SLP;
means for receiving a third message in response to the second message, the third message including an area event trigger for the area event;
means for determining at least one position estimate for the SET in response to the area event trigger being satisfied; and
means for reporting the at least one position estimate for the SET to the H-SLP.

20. The Secure User Plane Location enabled terminal (SET) of claim 19, further comprising:
means for selecting a positioning method from among a plurality of positioning methods supported by the SET, and wherein the at least one position estimate is determined in accordance with the selected positioning method.

21. The Secure User Plane Location enabled terminal (SET) of claim 19, further comprising:
means for determining the at least one position estimate for the SET in response to occurrence of the area event and in response to a standalone positioning method being selected.

22. The Secure User Plane Location enabled terminal (SET) of claim 19, further comprising:
means for determining the at least one position estimate for the SET in response to occurrence of the area event and in response to a SET based positioning method being selected.

23. The Secure User Plane Location enabled terminal (SET) of claim 19, wherein the area event trigger comprises the SET entering a predefined geographic area.

24. The Secure User Plane Location enabled terminal (SET) of claim 19, wherein the area event trigger comprises the SET leaving a predefined geographic area.

25. The Secure User Plane Location enabled terminal (SET) of claim 19, wherein the area event trigger comprises the SET remaining within a predefined geographic area.

26. The Secure User Plane Location enabled terminal (SET) of claim 19, wherein the third message comprises a reporting mode indicator.

27. A non-transient computer-readable medium having instructions, encoded thereon, executable by a computer, comprising instructions to:
receive a first message from a Home SUPL Location Platform (H-SLP) for initiating a triggered location session, the first message including a trigger type and a positioning method requested by the H-SLP, wherein the trigger type is an area event;
transmit a second message to the H-SLP to start the triggered location session in response to the first message, wherein the second message includes an indication whether the SET can support the positioning method requested by the H-SLP;
receive a third message in response to the second message, the third message including an area event trigger for the area event;

determine at least one position estimate for a SET in response to the area event trigger being satisfied;
report the at least one position estimate for the SET to the H-SLP.

28. The non-transient computer-readable medium of claim 27, further comprising instructions to:
select a positioning method from among a plurality of positioning methods supported by the SET, and wherein the at least one position estimate is determined in accordance with the selected positioning method.

29. The non-transient computer-readable medium of claim 27, further comprising instructions to:
determine the at least one position estimate for the SET in response to occurrence of the area event and in response to a standalone positioning method being selected.

30. The non-transient computer-readable medium of claim 27, further comprising instructions to:
determine the at least one position estimate for the SET in response to occurrence of the area event and in response to a SET based positioning method being selected.

31. The non-transient computer-readable medium of claim 27, wherein the area event trigger comprises the SET entering a predefined geographic area.

32. The non-transient computer-readable medium of claim 27, wherein the area event trigger comprises the SET leaving a predefined geographic area.

33. The non-transient computer-readable medium of claim 27, wherein the area event trigger comprises the SET remaining within a predefined geographic area.

34. The non-transient computer-readable medium of claim 27, wherein the third message comprises a reporting mode.

35. The Secure User Plane Location enabled terminal of claim 1, wherein determining the at least one position estimate for the SET in response to the area event trigger being satisfied comprises comparing a position estimate to the area-event condition.

* * * * *